(12) United States Patent
Shim

(10) Patent No.: US 10,120,564 B2
(45) Date of Patent: Nov. 6, 2018

(54) USER INTERFACE DEVICE, VEHICLE HAVING THE SAME, AND METHOD OF CONTROLLING THE SAME

(71) Applicant: HYUNDAI MOTOR COMPANY, Seoul (KR)

(72) Inventor: Kyudae Shim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 193 days.

(21) Appl. No.: 14/856,305

(22) Filed: Sep. 16, 2015

(65) Prior Publication Data

US 2016/0077730 A1 Mar. 17, 2016

(30) Foreign Application Priority Data

Sep. 17, 2014 (KR) ........................ 10-2014-0123886

(51) Int. Cl.
| | | |
|---|---|---|
| *G06F 3/048* | (2013.01) | |
| *G06F 3/0488* | (2013.01) | |
| *G06F 3/0481* | (2013.01) | |

(52) U.S. Cl.
CPC ...... *G06F 3/04883* (2013.01); *G06F 3/04817* (2013.01); *G06F 3/04886* (2013.01); *B60K 2350/1004* (2013.01)

(58) Field of Classification Search
CPC ............. G06F 3/04817; G06F 3/04883; G06F 3/04886
See application file for complete search history.

(56) References Cited

U.S. PATENT DOCUMENTS

| | | | | |
|---|---|---|---|---|
| 7,986,306 B2* | 7/2011 | Eich | ...................... | G06F 3/0219 345/156 |
| 8,661,339 B2* | 2/2014 | Weeldreyer | ........... | G06F 3/0488 715/252 |
| 8,907,773 B2* | 12/2014 | Choi | ..................... | B60W 50/14 340/425.5 |
| 9,349,045 B2* | 5/2016 | Bouaziz | ............. | G01C 21/3611 |

(Continued)

FOREIGN PATENT DOCUMENTS

| | | |
|---|---|---|
| JP | 2006-084329 A | 3/2006 |
| JP | 2007-199329 A | 8/2007 |

(Continued)

OTHER PUBLICATIONS

English translation of Korean Notice of Allowance dated Jan. 18, 2017 issued in Korean Patent Application No. 10-2014-0123886.

*Primary Examiner* — William Bashore
*Assistant Examiner* — Gregory A DiStefano
(74) *Attorney, Agent, or Firm* — McDermott Will & Emery LLP

(57) ABSTRACT

A user interface device, a vehicle having the same, and a method of controlling the same, implement a display unit configured to display a plurality of characters, a dial part configured to select any one character among the plurality of characters, and a touch part configured to be touched by a user. A control unit of the interface is configured to select a handwritten recognition mode as a character input mode when the touch part is touched, and select a dial operation mode as the character input mode when the dial part is operated, thereby improving user convenience.

19 Claims, 23 Drawing Sheets

(56) References Cited

U.S. PATENT DOCUMENTS

| | | | |
|---|---|---|---|
| 2002/0019731 A1* | 2/2002 | Masui | G06F 17/276 704/7 |
| 2003/0007018 A1* | 1/2003 | Seni | G06F 3/0237 715/864 |
| 2007/0070045 A1* | 3/2007 | Sung | G06K 9/222 345/173 |
| 2012/0242579 A1 | 9/2012 | Chua | |

FOREIGN PATENT DOCUMENTS

| | | | |
|---|---|---|---|
| JP | 2008-117158 A | | 5/2008 |
| JP | 2010-127925 A | | 6/2010 |
| KR | 20080054489 A | * | 12/2006 |
| KR | 10-2009-0021008 A | | 2/2009 |
| KR | 10-2010-0022752 A | | 3/2010 |
| KR | 10-1439057 B1 | | 9/2014 |

* cited by examiner

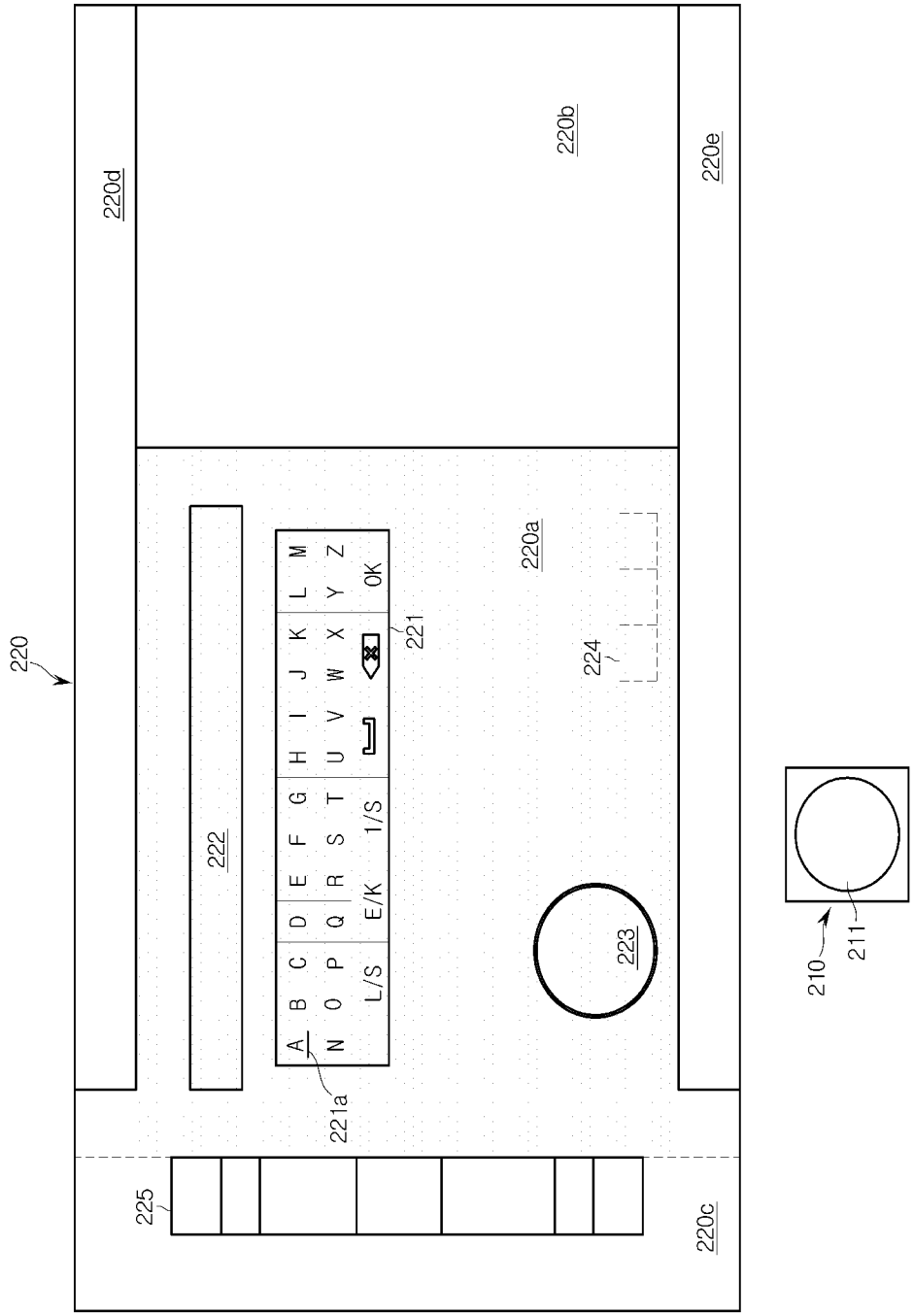

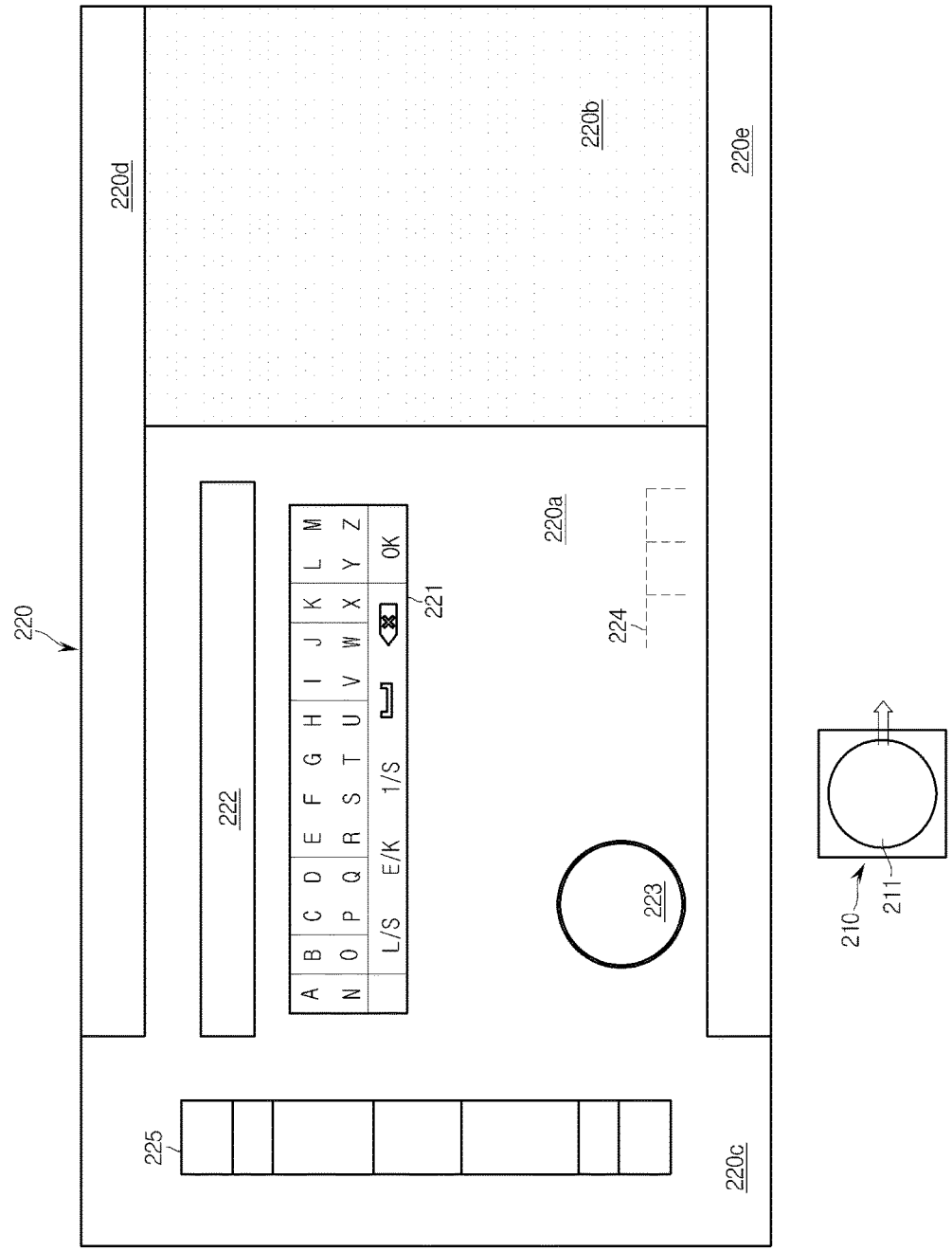

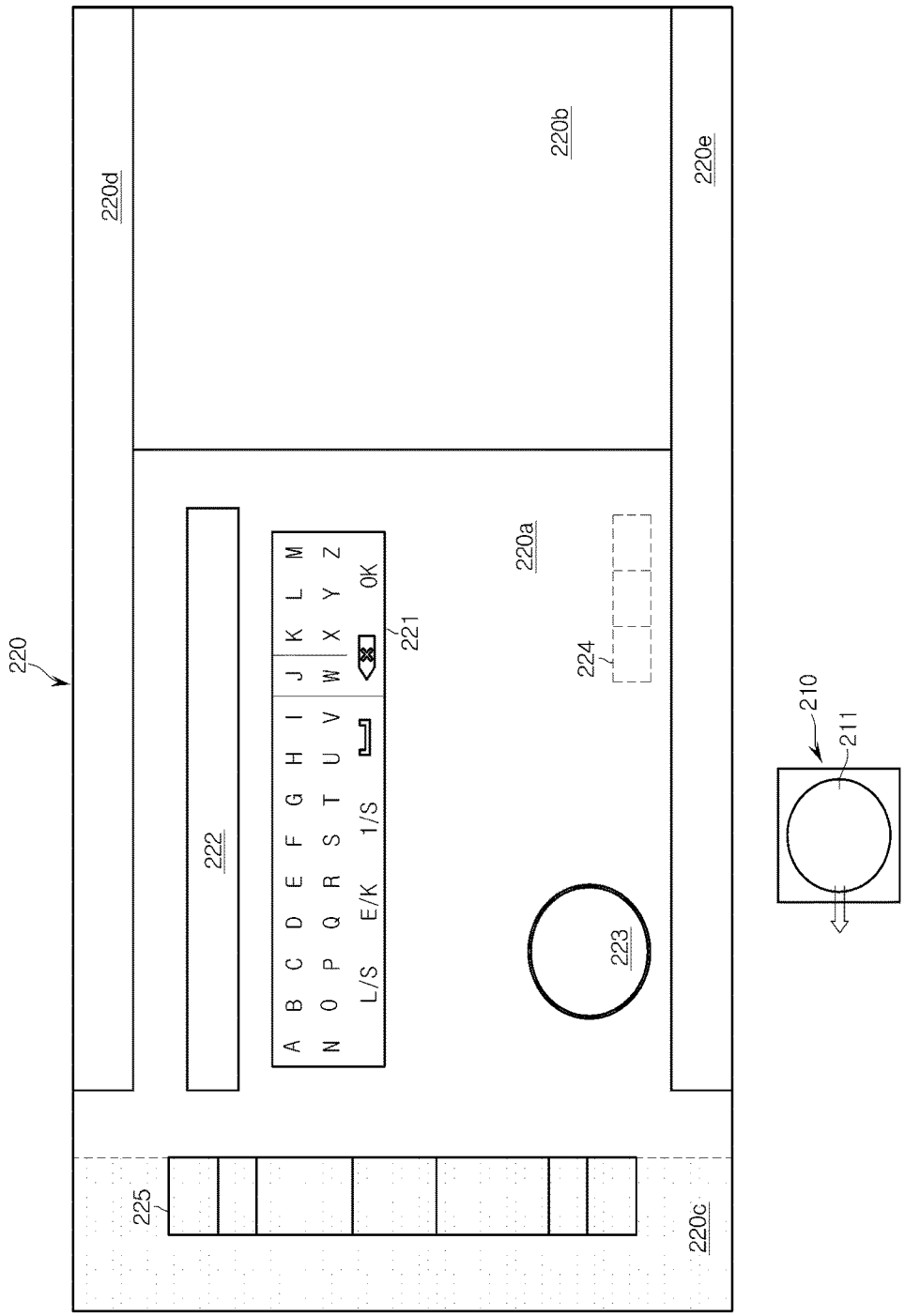

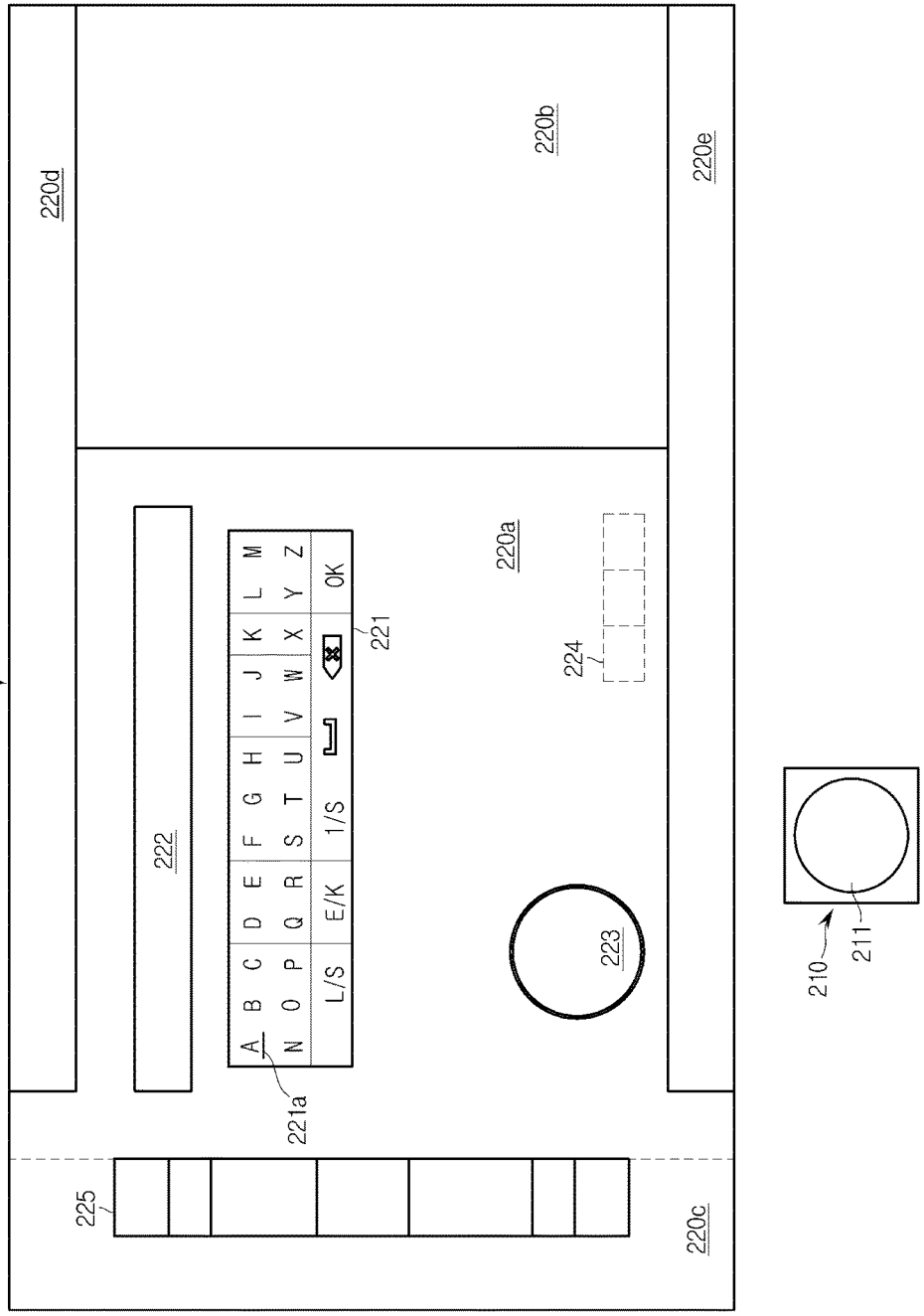

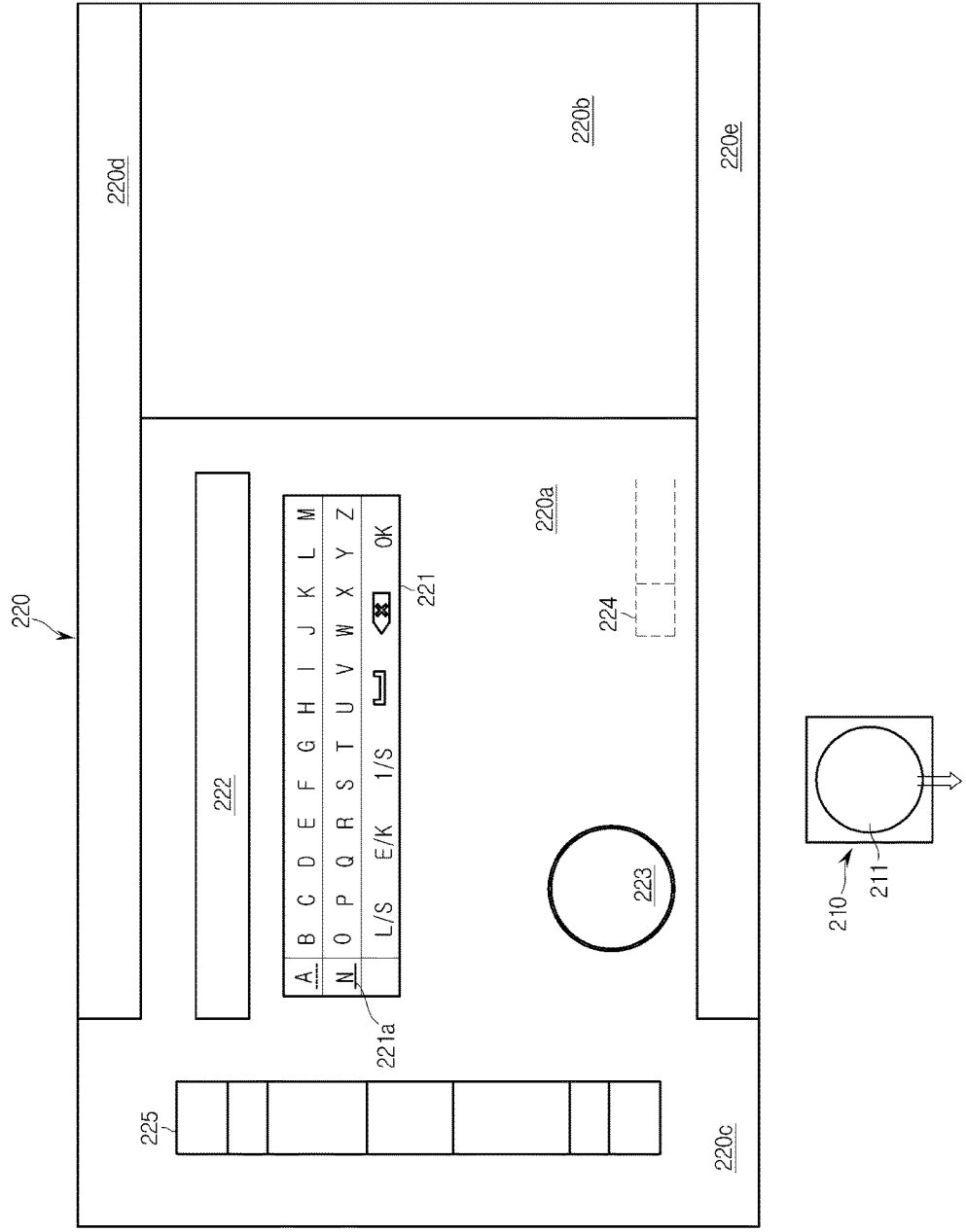

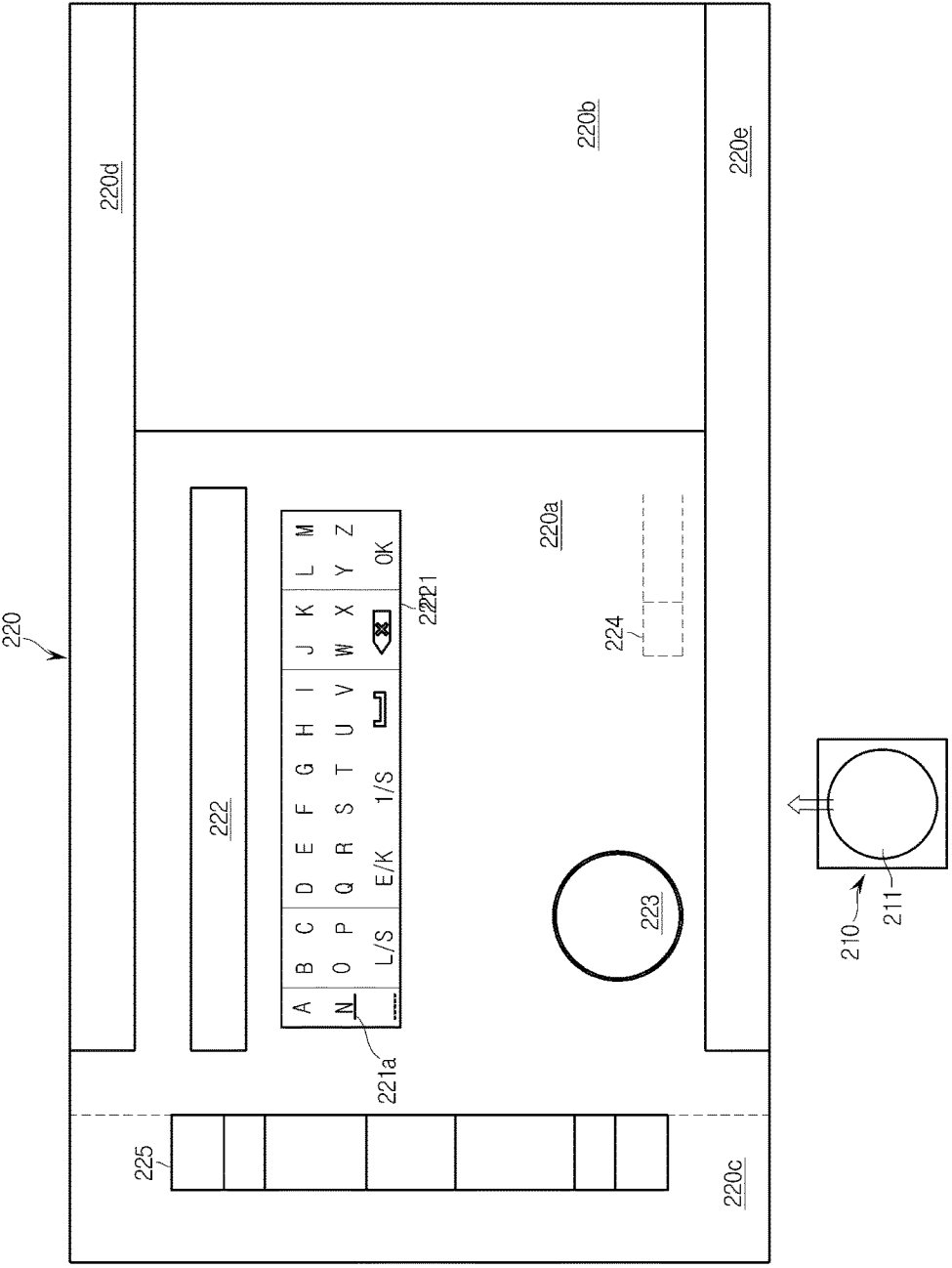

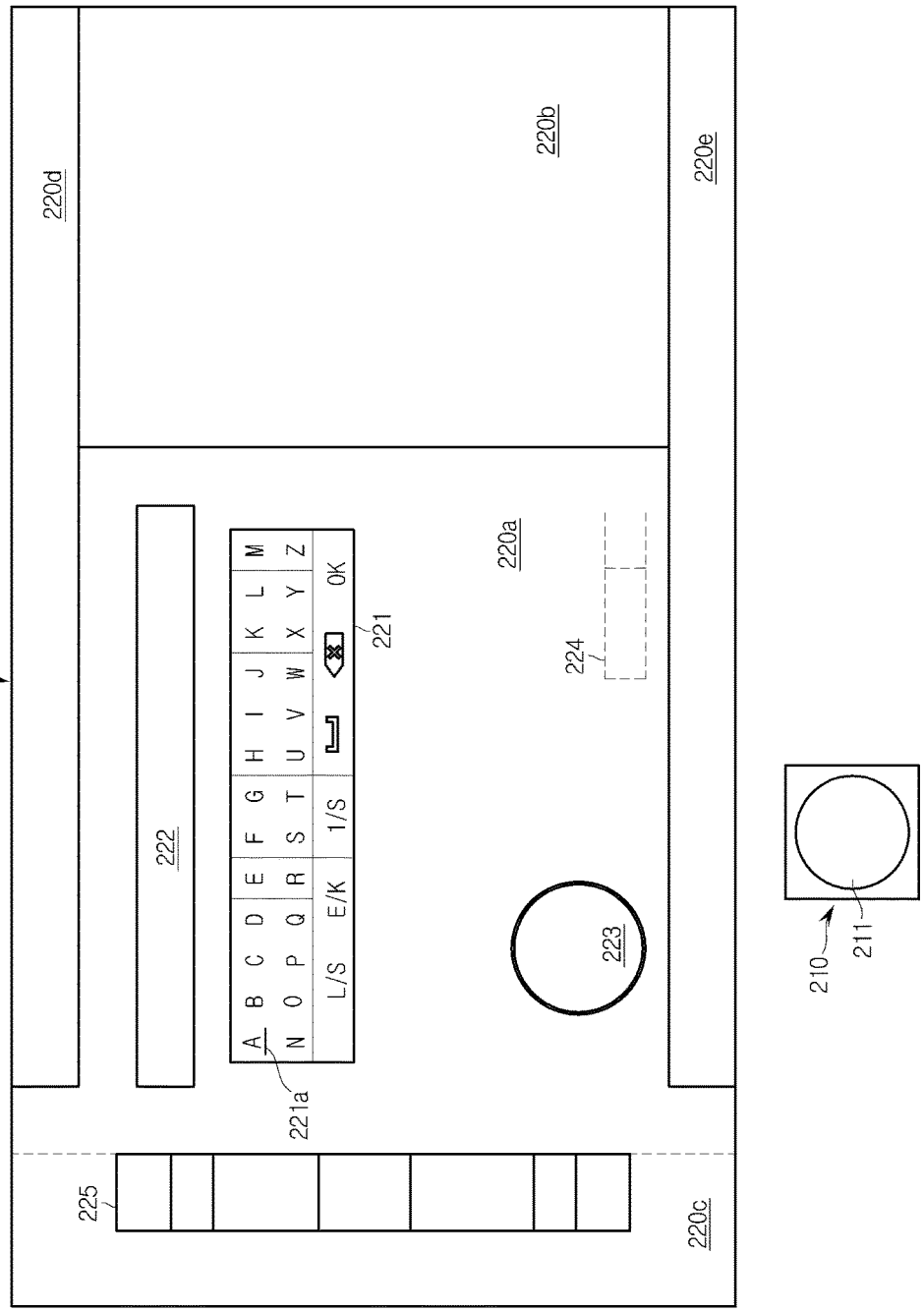

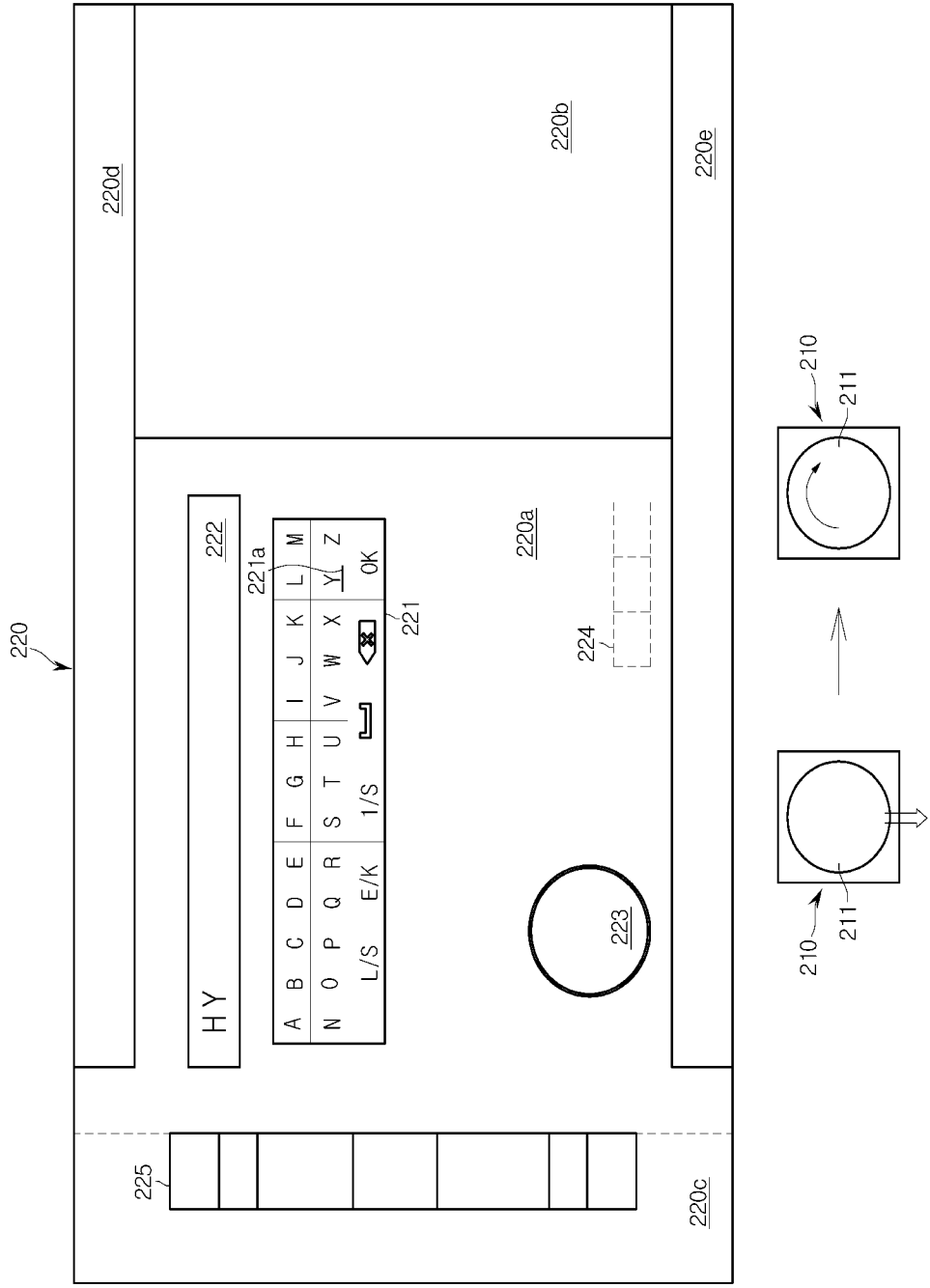

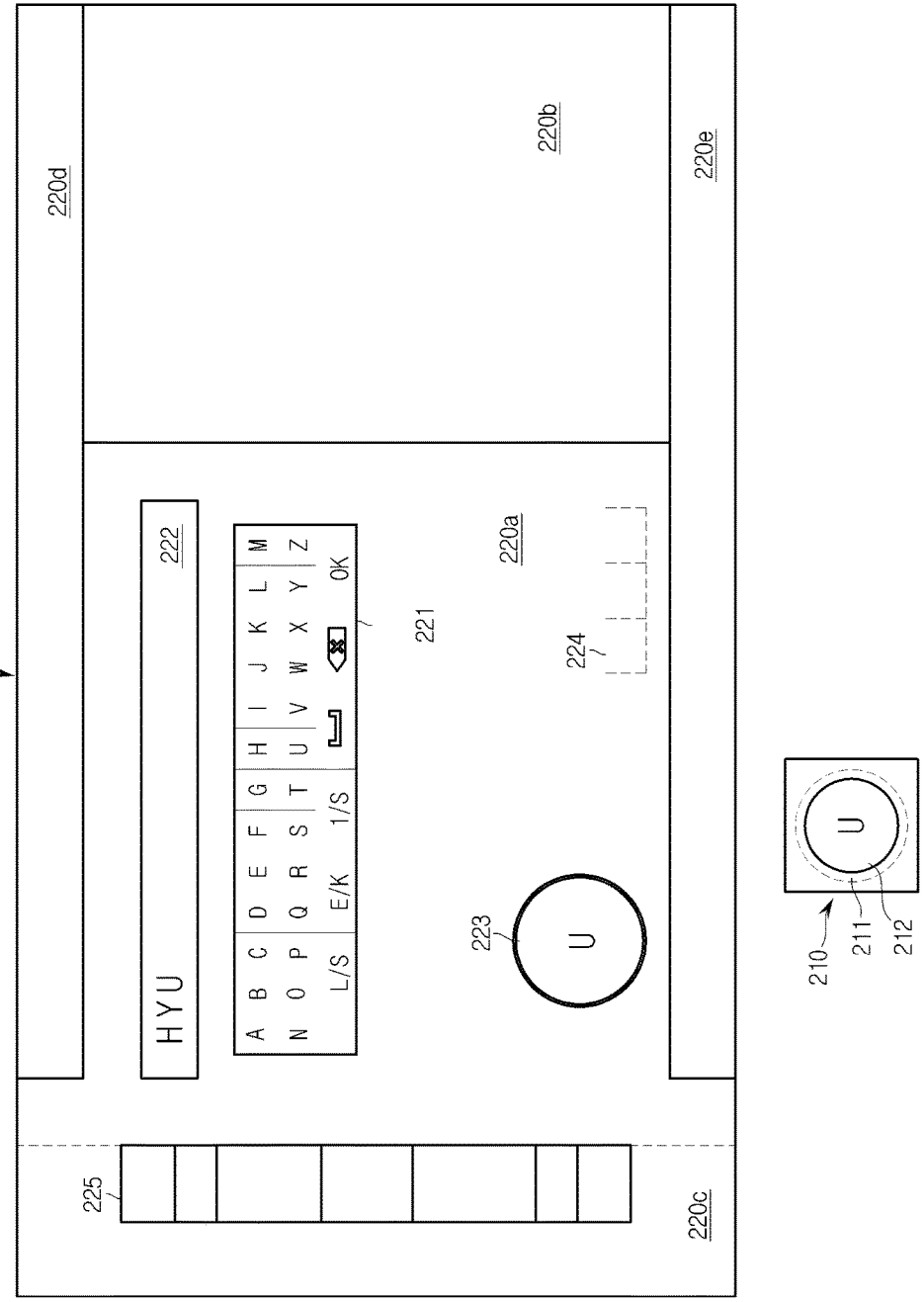

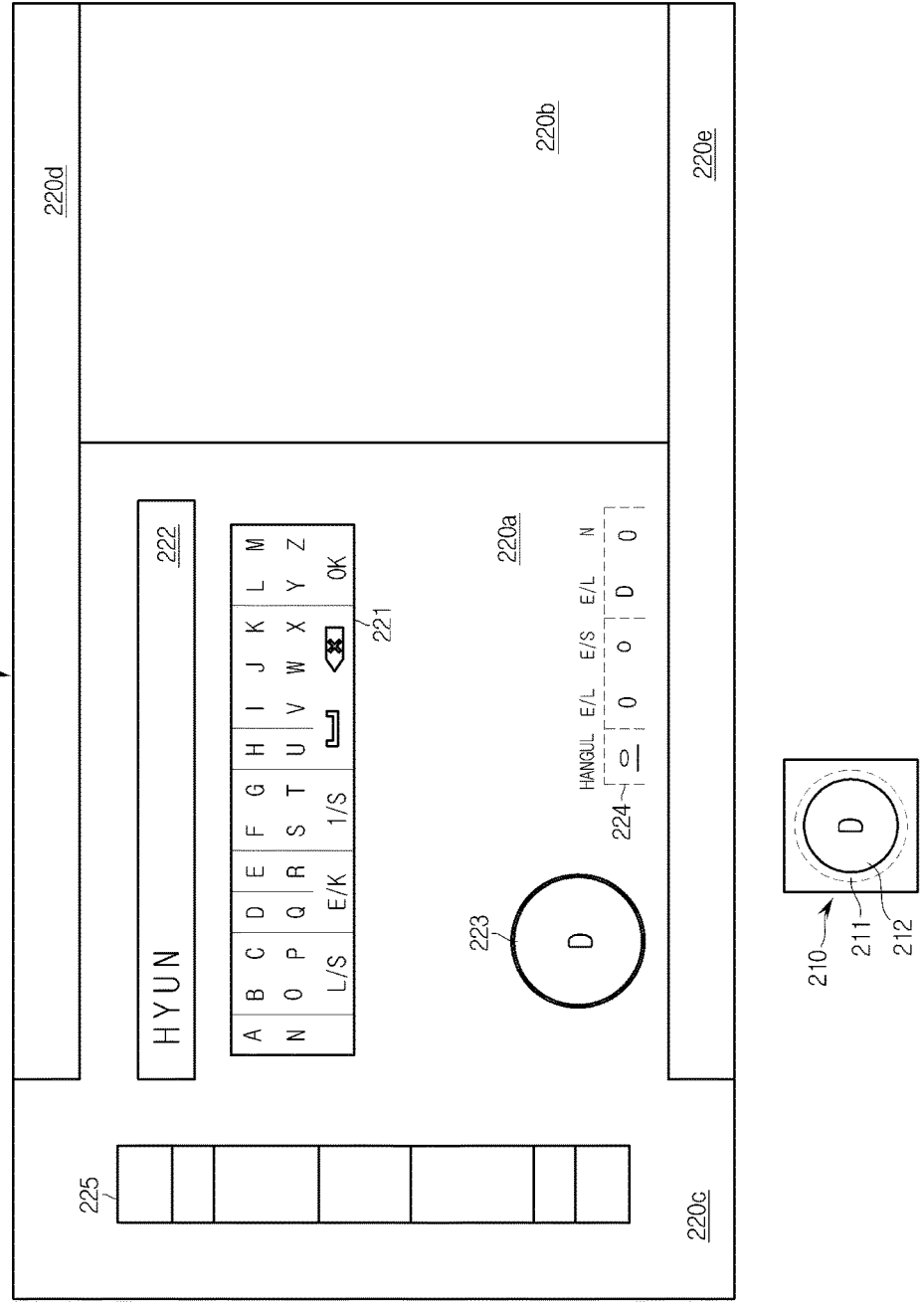

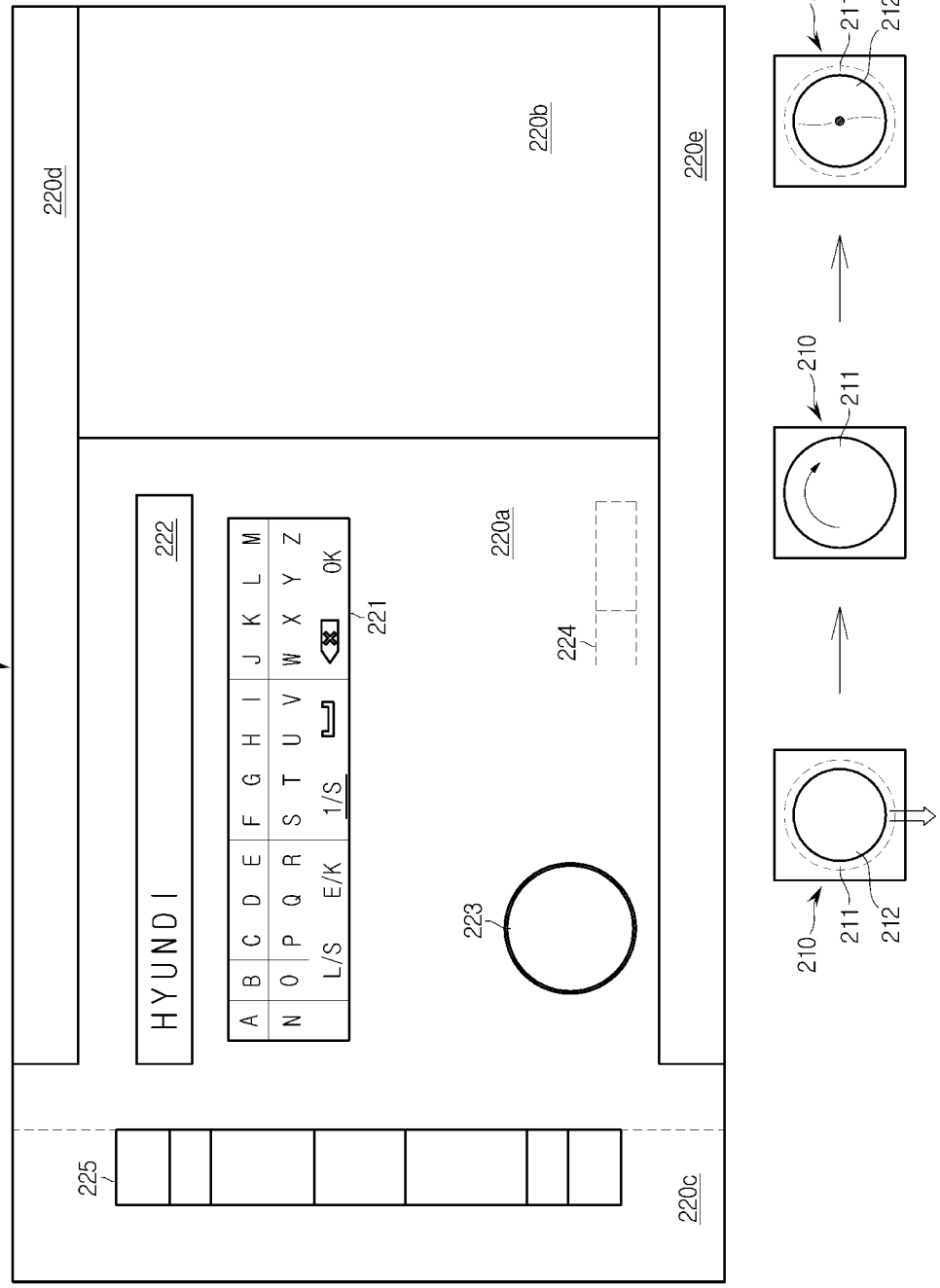

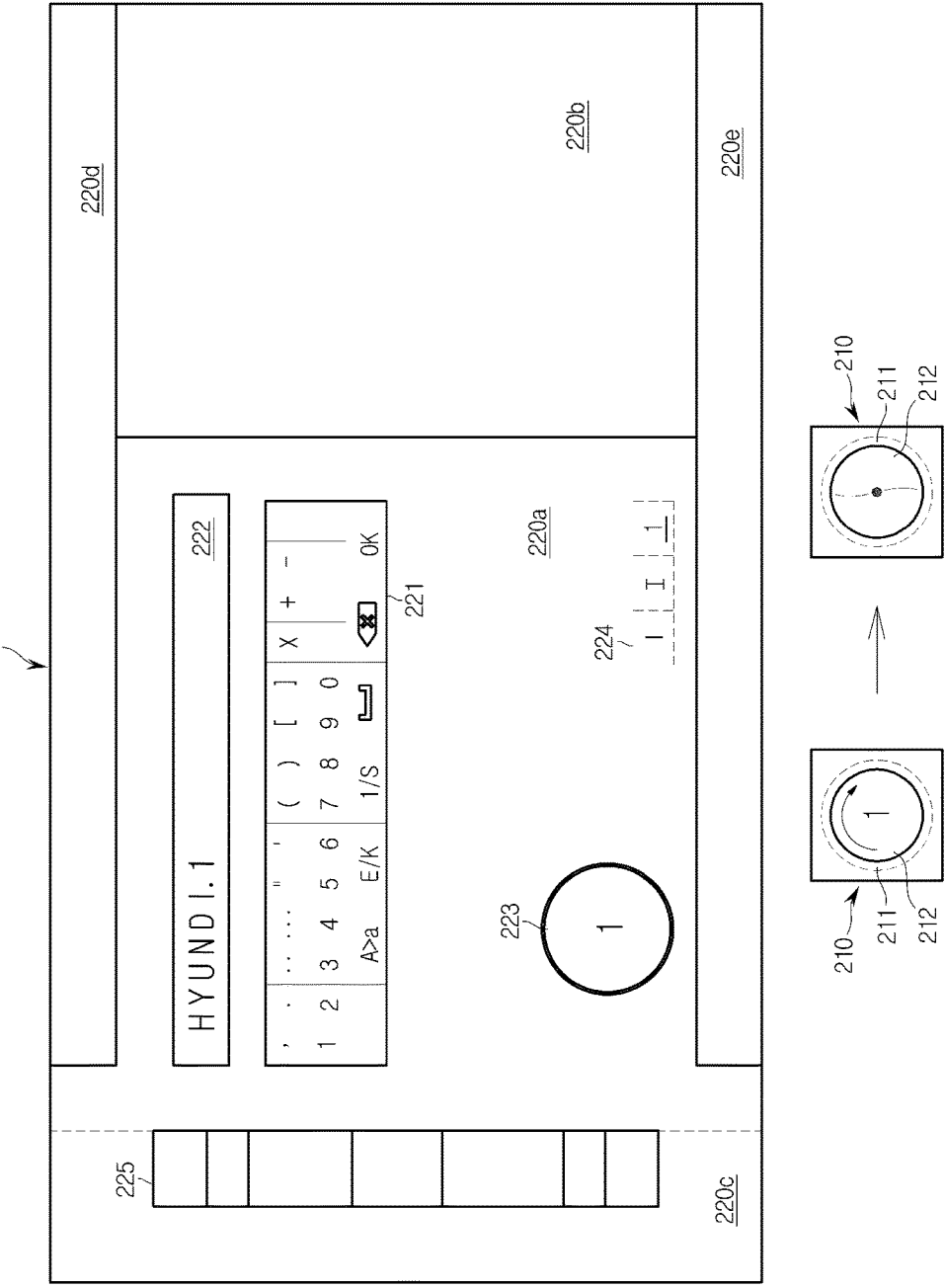

USER INTERFACE DEVICE, VEHICLE HAVING THE SAME, AND METHOD OF CONTROLLING THE SAME

CROSS-REFERENCE TO RELATED APPLICATION

This application claims the benefit of Korean Patent Application No. 10-2014-0123886, filed on Sep. 17, 2014 in the Korean Intellectual Property Office, the disclosure of which is incorporated herein by reference.

BACKGROUND

1. Field

Embodiments of the present invention relate to a user interface device for receiving an input of a command of a user, and outputting information on an operation which is being performed, a vehicle having the same, and a method of controlling the same.

2. Description of the Related Art

A vehicle generally includes a cluster for displaying driving functions such as vehicle speed, engine revolutions per minute (RPM), fuel level, cooling water, etc and vehicle information.

Further, the vehicle further may include additional functions for a user's convenience such as an audio function, a video function, a navigation function, air conditioning control, seat control, lighting control, etc. besides the basic driving functions.

The vehicle may include an audio, video, navigation (AVN) device in which a navigation function, an audio function, and a video function are integrated.

The vehicle further includes a user interface device for inputting various operation commands and outputting operation conditions of various functions, and the user interface device may be installed in a center fascia.

The user interface device is a device as an interface between various devices in the vehicle and the user, and there are a physical user interlace (PUI) device and a graphic user interface (GUI) device in the user interface device.

The PUI device is a device for inputting a user command using a keypad, a remote controller, a jog dial, a touch pad, etc., and the GUI device is a device for inputting a user command when an icon or a menu displayed on a display unit is selected.

That is, the user moves a cursor with reference to a menu, a list, an icon, etc. displayed through the GUI device, and selects an item in which the cursor locates. At this time, the user can select the item to be desired while moving the cursor using the PUI device.

The user interface device inputs a character by operating the touch pad or the jog dial arranged on the GUI device. However, there is inconvenience in that the user interface device has to select after switching a mode by a touch operation or a handling operation when selecting a language such as English and Korean, etc. or selecting a number and a special character.

SUMMARY

Therefore, it is one aspect of the present invention to provide a user interface device capable of switching automatically, between a character input mode selecting a character which is displayed on a display unit, by moving a dial in a straight line and rotating the dial, and a character input mode receiving an input of a character using handwriting recognition, a vehicle having the same, and a method of controlling the same.

It is another aspect of the present invention to provide a user interface device capable of recognizing a handwritten character by comparing the handwritten character and a plurality of characters prestored regardless of a group of a character displayed on a display unit in a character input mode using handwriting recognition, a vehicle having the same, and a method of controlling the same.

It is still another aspect of the present invention to provide a user interface device capable of displaying a candidate group when a recognition rate of a handwritten character is smaller than a reference handwritten recognition rate, a vehicle having the same, and a method of controlling the same.

Additional aspects of the invention will be set forth in part in the description which follows and, in part, will be obvious from the description, or may be learned by practice of the invention.

In accordance with one aspect of the present invention, a user interface device, includes: a display unit configured to display a plurality of characters; a dial part configured to select any one character among the plurality of characters; a touch part configured to be touched by a user; and a control unit configured to select a handwritten recognition mode as a character input mode when the touch part is touched, and select a dial operation mode as the character input mode when the dial part is operated.

The control unit may recognize a character selected by the user based on an operation signal of the dial part, and perform control to display the recognized character on the display unit.

The control unit may recognize a character handwritten by the user based on a touch signal of the touch part, and perform control to display the recognized character on the display unit.

The control unit may confirm a matching rate by comparing the handwritten character and each of a plurality of prestored characters, confirm a candidate group of the handwritten character when the confirmed matching rate is less than a reference matching rate, and perform control to display the confirmed candidate group.

The control unit may confirm a character having a matching rate which is in the range of a predetermined matching rate among matching rates between the handwritten character and the plurality of characters as the candidate group.

The control unit may confirm a character selected by the user among characters included in the candidate group based on an operation signal of the dial part.

The control unit may switch the character input mode to the dial operation mode when a dial operation signal is input in the dial part after the touch signal is input in the touch part.

The plurality of characters may include a first character group and a second character group corresponding to a kind of a character, and the control unit may perform control to maintain display of the first character group on the display unit when the second character group is handwritten in the touch part in a state in which the first character group is displayed on the display unit.

The control unit may perform control to display by switching the kind of the character based on an operation signal of the dial part.

The dial part and the touch part may be integrally formed, and the dial part and the touch part may be separately installed from the display unit.

In accordance with another aspect of the present invention, a vehicle, includes: a user interface device including a display unit configured to display a plurality of characters, and an input unit configured to move in a straight direction, rotate, and receive an input of a character; and the control unit configured to select a handwritten recognition mode of the user interface device as a character input mode when the input unit is touched, and select a dial operation mode as the character input mode when the input unit is moved.

The control unit may recognize a character selected by the user based on an operation signal of the input unit, recognize a character handwritten by the user based on a touch signal of the input unit, and perform control to display the recognized character on the display unit.

The control unit may confirm a matching rate by comparing the handwritten character and each of a plurality of prestored characters, confirm a candidate group of the handwritten character when the confirmed matching rate is less than a reference matching rate, and perform control to display the confirmed candidate group.

The control unit may confirm a character selected by the user among characters included in the candidate group based on the operation signal of the input unit.

The control unit may recognize the character input mode as the dial operation mode when the operation signal is input after the touch signal is input in the input unit.

The input unit of the user interface device may include a dial part configured to move in up, down, left, and right directions, and rotate clockwise and counterclockwise, and a touch part configured to generate the touch signal.

In accordance with still another aspect of the present invention, a method of controlling a user interface device comprising a display unit, a dial part, and a touch part, includes: performing a character input mode; selecting a dial operation mode as the character input mode when the dial part is operated; recognizing a character selected by a user among a plurality of characters displayed on the display unit based on an operation signal of the dial part; selecting a handwritten recognition mode as the character input mode when the touch part is touched; recognizing the character handwritten by the user based on the touch signal of the touch part; and displaying the recognized character on the display unit.

The recognizing of the character handwritten by the user, may include: confirming a matching rate by comparing the handwritten character and each of a plurality of prestored characters; selecting a character having a matching rate which is in the range of a predetermined matching rate among matching rates between the handwritten character and the plurality of characters when the confirmed matching rate is less than a reference matching rate as a candidate group; displaying the selected candidate group; confirming a character selected by the user among characters of the candidate group based on an operation signal of the dial part; and displaying the recognized character on the display unit.

The method of controlling the user interface device may further include: switching the character input mode to the dial operation mode when the dial operation signal is input after a touch signal is input in the touch part.

The plurality of characters may include a first character group and a second character group corresponding to a kind of a character, and the displaying of the recognized characters on the display unit may include: displaying the first character group on the display unit; and recognizing the second character group which is handwritten when the second character group is handwritten in the touch part, and maintaining display of the first character group on the display unit.

The method of controlling the user interface device may further include: determining whether a character group switch icon is selected among the plurality of characters based on the operation signal of the dial part; and displaying by switching the first character group displayed on the display unit to the second character group when it is determined that the character group switch icon is selected.

BRIEF DESCRIPTION OF THE DRAWINGS

These and/or other aspects of the invention will become apparent and more readily appreciated from the following description of the embodiments, taken in conjunction with the accompanying drawings of which:

FIGS. 6A-6C are diagrams illustrating examples of activation of a plurality of areas of a display unit corresponding to an operation of an input unit provided in a user interface device according to an embodiment of the present invention;

FIGS. 7A-7C are diagrams illustrating examples of cursor movement of a display unit corresponding to an operation of an input unit provided in a user interface device according to an embodiment of the present invention;

FIGS. 9 to 14C are diagrams illustrating examples of display corresponding to a character input mode of a user interface device according to an embodiment of the present invention.

DETAILED DESCRIPTION

Hereinafter, embodiments of the present invention will be described in detail with reference to the accompanying drawings.

Figure 1:
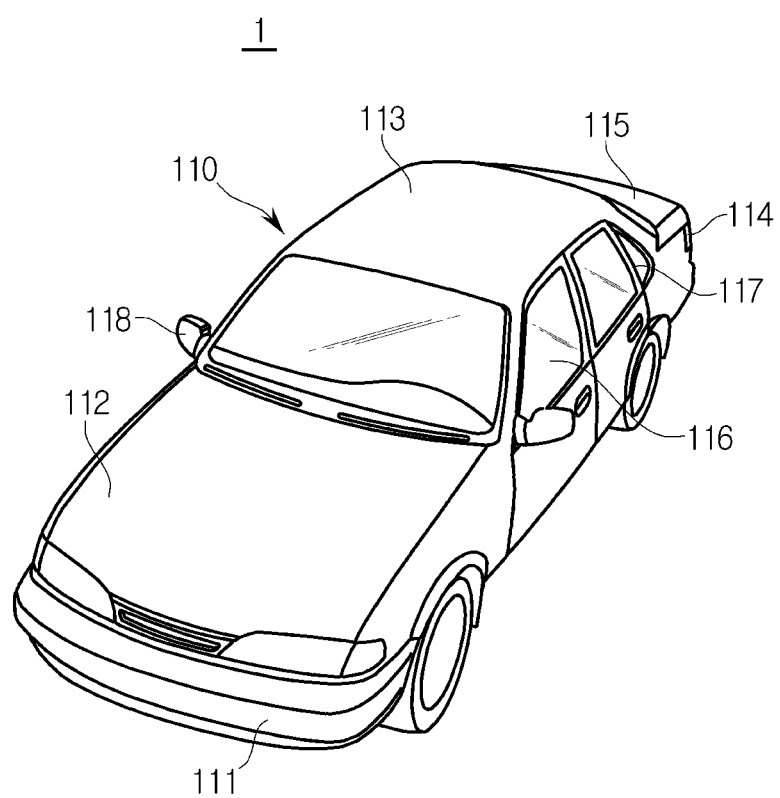
FIG. 1 is a diagram illustrating a vehicle in which a user interface device is installed according to an embodiment of the present invention.
Figure 2:
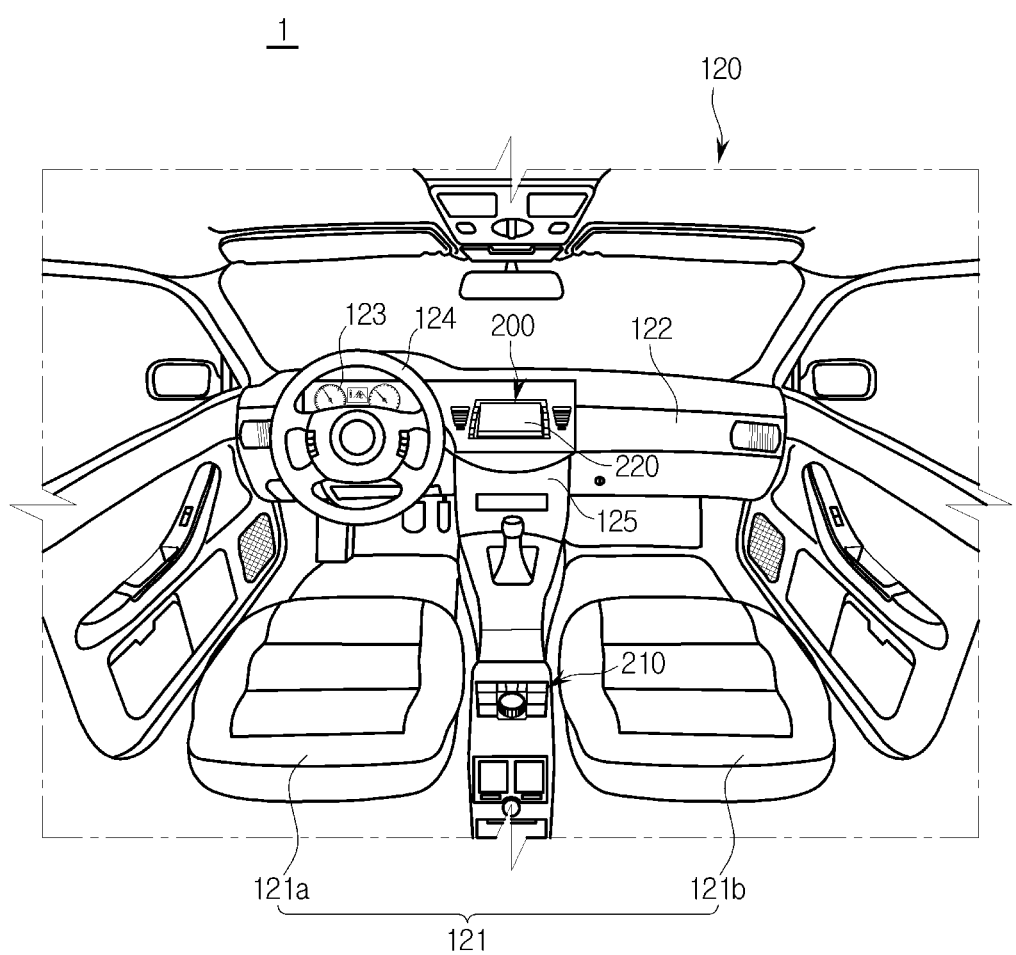
FIG. 2 is a diagram illustrating the inside of a vehicle in which a user interface device is installed according to an embodiment of the present invention.

FIG. 1 is a diagram illustrating a vehicle in which a user interface device is installed according to an embodiment of the present invention, and FIG. 2 is a diagram illustrating the inside of a vehicle in which a user interface device is installed according to an embodiment of the present invention.

A vehicle 1 may be an apparatus driven by wheels for the purpose of transporting a person or goods, and move on a road.

The vehicle 1 may include a body having an interior and an exterior, and a chassis in which machine apparatuses needed for driving are installed as a remaining portion excluding the body.

As shown in FIG. 1, the exterior 110 of the body may include a front panel 111, a hood 112, a roof panel 113, a rear panel 114, a trunk 115, and front, rear, left and right doors 116, etc.

The exterior 110 of the body may further include a pillar 117 provided in the boundary of the front panel 111, the hood 112, the roof panel 113, the rear panel 114, the trunk 115, and the front, rear, left and right doors 116.

Further, the exterior 110 of the body may further include side windows installed in the front, rear, left and right doors 116, quarter windows installed between the pillars and cannot be open and closed, a rear window installed in the rear side, and a front window installed in the front side.

The exterior 110 of the body may further include side mirrors 118 providing a driver with a field of view of the rear side of the vehicle 1.

The chassis of the vehicle 1 may include a power generation apparatus, a power transfer apparatus, a driving apparatus, a steering apparatus, a brake apparatus, a suspension apparatus, a transmission apparatus, a fuel apparatus, front, rear, left, and right wheels, etc.

The vehicle 1 may further include various safety apparatuses for safety of a driver and a passenger.

The safety apparatuses may includes various safety apparatuses such as an air bag control device for safety of the driver and the passenger at the time of a vehicle collision, and an electronic stability control (ESC) device for stably controlling the attitude of the vehicle while accelerating and cornering, etc.

The vehicle 1 may further include sensing devices such as a proximity sensor for sensing obstacles or another vehicle of the rear or the side, and a rain sensor for sensing rainfall and the amount of rainfall, etc.

The vehicle 1 may include an electronic control unit (ECU) for controlling driving of the power generation apparatus, the power transfer apparatus, the driving apparatus, the steering apparatus, the brake apparatus, the suspension apparatus, the transmission apparatus, the fuel apparatus, the various safety apparatuses, and various sensors.

Further, the vehicle 1 may selectively include electronic devices such as a hands-free apparatus, a global positioning system (GPS), an audio device, a Bluetooth apparatus, a rear camera, a terminal charge device, a Hi-pass device, etc., which are installed for the driver's convenience.

The vehicle 1 may further include a start button for inputting an operation command to a start motor (not shown).

That is, the vehicle 1 may operate the start motor when the start button is turned on, and may drive an engine (not shown) which is the power generation apparatus by operation of the start motor.

The vehicle 1 may further include a battery (not shown) which is electrically connected to a terminal, the audio device, a dome light, the start motor, and other electronic devices and provides driving power.

The battery may perform charging using a self-generator or the power of the engine while driving.

As shown in FIG. 2, the interior 120 of the body may include a seat 121 (121a and 121b) in which a passenger sits, a dash board 122, an instrument panel (that is, a cluster) 123 which is arranged on the dash board 122 and in which a tachometer, a speedometer, a coolant temperature meter, a fuel gauge, a turn signal indicator light, a high beam indicator light, a warning light, a safety belt warning light, an odometer, an automatic shift selection lever indicator light, a door alarm warning light, an engine oil warning light, and a fuel shortage warning light are installed, a steering wheel 124 for controlling direction of the vehicle 1, and a center fascia 125 in which a control panel of the audio device and the air conditioning device are installed.

The seat 121 may include a driver seat 121a for a driver, a passenger seat 121b for a passenger, and rear seats located in the rear side inside the vehicle 1.

The cluster 123 may be implemented by a digital method. The cluster 123 of the digital method may display vehicle information and driving information using an image.

The center fascia 125 may be located between the driver seat 121a and the passenger seat 121b in the dash board 122, and may include a control panel for controlling the audio device, the air conditioning device, and a heater.

An air outlet, and a cigarette lighter may be installed in the center fascia 125.

Further, a user interface device 200 for receiving input of information from a user, and outputting a result corresponding to the input information may be provided in the center fascia 125.

The user interface device 200 may be installed to be separated from the body 200a forming the exterior, and may include an input unit 210 for inputting an operation command or information.

The input unit 210 may be located in the center fascia 125, and may be located adjacent to the body 200a of the user interface device 200 or may be located around a gearshift.

Figure 3:
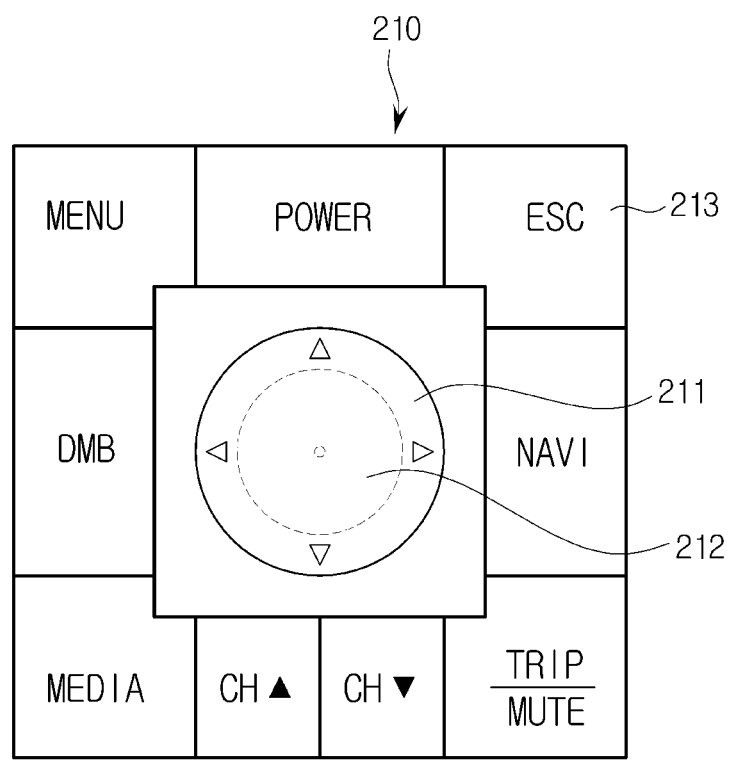
FIG. 3 is a diagram illustrating an input unit provided in a user interface device according to an embodiment of the present invention.

As shown in FIG. 3, the input unit 210 may include a dial part 211 for performing an operation of moving in up, down, left, and right directions and of rotating clockwise and counterclockwise, a touch part 212 having a touch pad and capable of detecting a touch, and may further include a button part 213 having a plurality of buttons in which a plurality of functions are set, respectively. Here, the touch part 212 and the dial part 211 may be installed in an integral or separate manner, and the touch part 212 and the dial part 211 which are installed in the integral manner may be installed to be separated from the display unit 220.

The plurality of buttons may have a power function, a menu function, an escape (ESC) function, a navigation function, a media function, a digital multimedia broadcasting (DMB) function, a trip function, etc, respectively, and may transmit an input signal to a control unit so as to immediately perform any one function when being selected by a user.

The dial part 211 may be provided among the plurality of buttons of the button part 213, and the touch pad of the touch part 212 may be arranged in the dial part 211.

In this embodiment of the present invention, a case in which the touch part 212 is integrally formed in the upper surface of the dial part 211 of a cylindrical form will be described as an example.

The user interface device 200 may include a display unit 220 for displaying various operation information, for example, an execution image of a function selected by the user.

Figure 4:
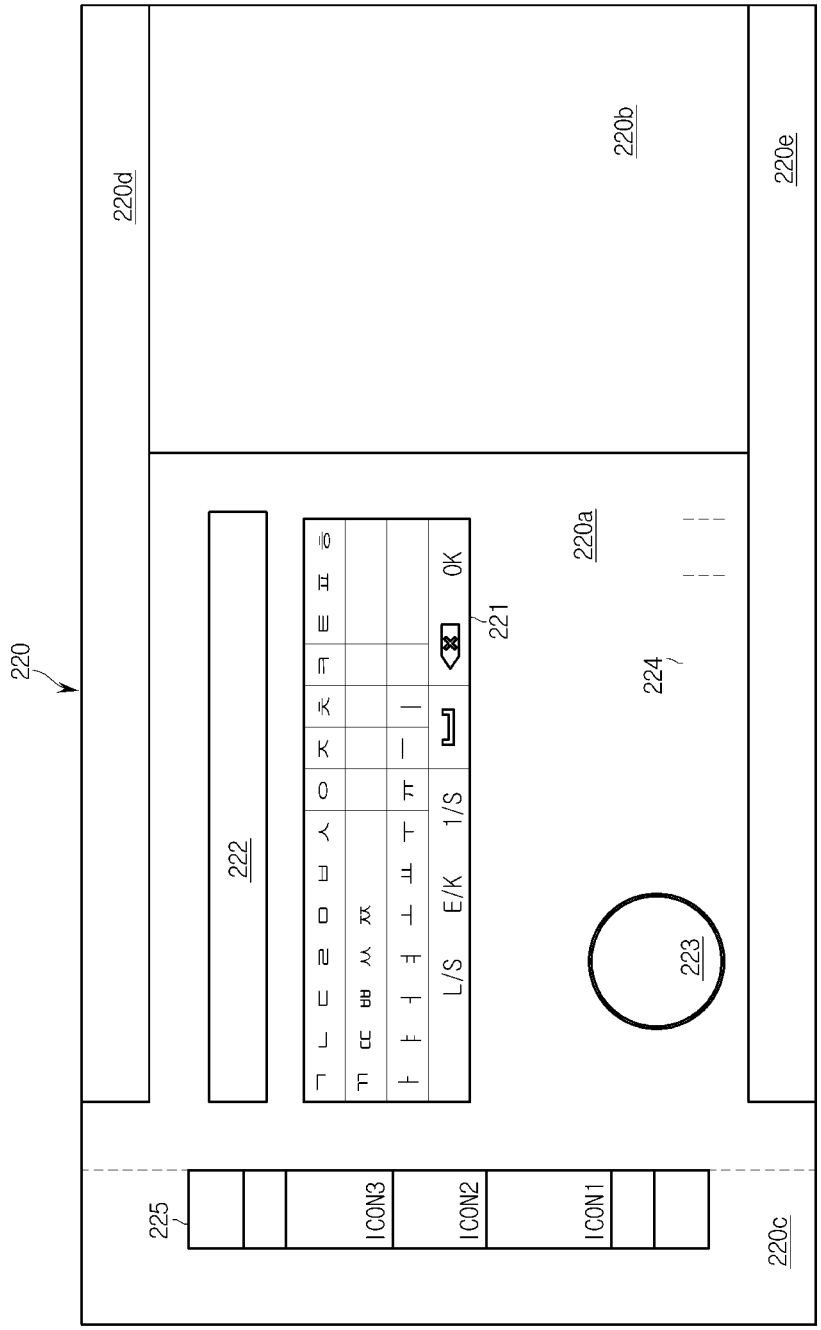
FIG. 4 is a diagram illustrating an example of a display unit of a user interface device according to an embodiment of the present invention.

As shown in FIG. 4, the display unit 220 of the user interface device 200 may further include a first region 220a for inputting a character, a second region 220b in which a function execution image is displayed, and a third region 220c in which icons for selecting functions are displayed, and may further include a fourth region 220d in which basic information is displayed, and a fifth region 220e in which air conditioning information is displayed.

The first region 220a may display a plurality of windows for inputting the character. This will be described in more detail.

The first region 220a may include a character window 221, an input window 222, a dial window 223, and a candidate window 224.

The character window 221 may display a plurality of characters, and may display by grouping the plurality of characters in units of blocks. The character window 221 may display by grouping according to a kind of a character.

Here, the kind of the character may include a first character group including consonants and vowels of Hangul, a second character group including alphabets of English, a third character group including Arabic numbers, a fourth character group including specific characters such as an exclamation mark, a question mark, and a period, and a fifth character group including Chinese characters.

Further, the displaying by grouping according to the kind of the character may include displaying another character group using a screen change.

The input window 222 may display a character input by the user.

The character input by the user may include a character selected by an operation of the dial part 211, and a character which is handwritten in the touch part 212.

The dial window 223 may be activated by being touched by the user, and may display the character which is handwritten by the user.

Further, the dial window 223 may display an emoticon (for example, an image of a hand shape) indicating while being touched when detecting a touch.

The candidate window 224 may display a character similar to the character which is handwritten in a handwritten recognition mode.

The candidate window 224 may display a block corresponding to the number of characters of a candidate group, and may display characters of the candidate group in each block.

The candidate window 224 may be displayed only when a matching rate of the handwritten character is less than a reference matching rate in the handwritten recognition mode.

The second region 220b may be a region for displaying the function execution image, displaying a map and navigation image when the navigation function is executed by the user, displaying a broadcasting image when the DMB function is executed, and displaying information related to music which is played when the audio function is executed.

The third region 220c may be a region for displaying icons for selecting functions, and display an icon for destination input, an icon for Internet search, an option set icon, etc.

The fourth region 220d may display information of a date, and a time, etc., and weather information, etc., and display an icon of a function which is currently being performed.

The fourth region 220d may be divided into two regions. One region may have a title window of the first region, and the other region may have a clock window.

Further, the other region of the fourth region 220d may display an icon of a function which is being performed in the second region 220b.

The fifth region 220e may display air conditioning information such as room temperature, outdoor temperature, etc., and display temperature, air volume, etc. of each spac such as the driver seat, the passenger seat, and the center fascia, etc.

The user interface device 200 installed in the vehicle 1 may be the navigation (AVN) device, and a terminal capable of performing communication in which a navigation application is installed.

The navigation device may be a device for receiving position information from satellites through a plurality of global positioning systems (GPSs), calculating a current position of the vehicle, displaying the calculated current position by matching on a map, performing a path search from the calculated current position to destination according to a predetermined path search algorithm by inputting the destination from the user, displaying the searched path by matching on the map, and guiding the user to the destination according to the path, The navigation device may be installed to be detachable on the dash board 122.

In the embodiment of the present invention, as an example of the user interface device 200, the navigation device will be described.

Figure 5:
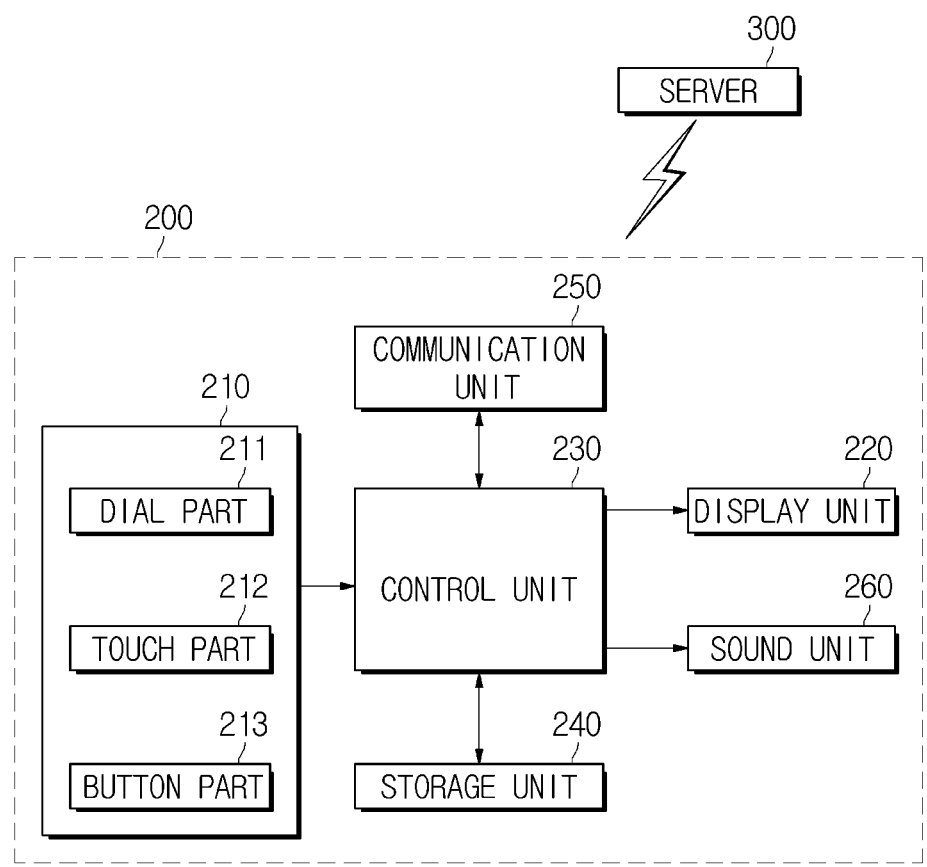
FIG. 5 is a diagram illustrating a control construction of a user interface device according to an embodiment of the present invention.

FIG. 5 is a diagram illustrating a control construction of a user interface device according to an embodiment of the present invention, a user interface device 200 that may include an input unit 210, a display unit 220, a control unit 230, a storage unit 240, a communication unit 250, and a sound unit 260. This will be described with reference to FIGS. 6A to 7C.

The input unit 210 may be a unit for receiving input of a command from a user, and include a dial part 211, a touch part 212, and a button part 213, and transmit a signal input in the dial part 211, the touch part 212, and the button part 213 to a control unit 230.

The dial part 211 may include a jog dial for inputting a movement command, a selection command, etc. of a cursor displayed on the display unit 220, and the touch part 212 may include a touch pad.

The dial part 211 may transmit a movement signal of up, down, left, and right directions operated by a user, and a rotation signal of a first rotation direction and a second rotation direction to the control unit 230, and transmit a pressurization signal to the control unit 230.

The touch part 212 may transmit a signal describing the movement path of a touch position touched by the user to the control unit 230, and the button part 213 may transmit a signal by a button pressed by the user to the control unit 230.

The movement signal of the left and right straight line directions may be a movement signal of a region of the display unit 220, the movement signal of the up and down straight line directions may be a movement signal of up and down columns in the same region, and the rotation signal may be a movement signal of left and right blocks in the same column of the same region.

The touch part 212 may further include a detection unit for detecting position of a touch point touched by the user.

The display unit 220 may display information input by the user, and may display operation information of a function selected by the user.

For example, the display unit 220 may display an image of a character input mode for receiving an input of command information by the user, display operation information of a navigation function such as a map, road condition information, etc. for guiding a path, display a broadcasting image of the DMB, display music information of the audio, and display a search image for an Internet search.

The display unit 220 may display by dividing a plurality of regions, and display by activating any one region among the plurality of regions according to an operation signal which is moved in left and right straight line directions of the dial part 211.

This will be described with reference to FIGS. 6A to 6C.

As shown in FIG. 6A, the display unit 220 may move the activation region based on movement of the left and right straight line directions when the first region 220a is set as a reference region.

As shown in FIG. 6B, the display unit 220 may activate the second region 220b when the dial part 211 moves in the right straight line direction once in a state in which the first region 220a is activated.

Further, as shown in FIG. 6C, the display unit 220 may activate the third region 220c when the dial part 211 moves straight to the left direction once when the first region 220a is activated.

At this time, the activation region may be differently displayed with other regions.

The display unit 220 may be implemented by a flat display panel such as a liquid crystal display (LCD), a plasma display panel (PDP), an organic light emitting display (OLED), etc.

Further, the display unit 220 may be implemented by a touch screen type by further including a touch panel which is integrally formed in a flat display panel.

The display unit 220 may display a character window 221, an input window 222, a dial window 223, and a candidate window 224 for inputting a character in the first region 220a, in the character input mode, display a cursor 221a in any one block among a plurality of blocks of the character window 221, and display by changing a position of the cursor 221a based on the operation signal of the dial part 211.

This will be described with reference to FIGS. 7A to 7C.

As shown in FIG. 7A, the display unit 220 may activate the first region 220a, and at this time, display the first character group in each block of the character window 221, and display the cursor 221a in the reference block.

As shown in FIG. 7B, the display unit 220 may display by moving the cursor 221a from the reference block to a block located down one column when the dial part 211 moves in the down straight line direction once.

As shown in FIG. 7C, the display unit 220 may display by moving the cursor 221a to a block located up one column when the dial part 211 moves in the up straight line direction once in a state in which the cursor 221a is located in a first block of the lowermost column.

Further, the display unit 220 may differently display any one block of the character window 221 with another block.

For example, the display unit 220 may display any one block using a color different from that of another block, instead of displaying the cursor 221a in any one block.

Here, any one block may be a block in which a character which is selectable by the user locates.

The display unit 220 may display a plurality of characters in the character window 221, and display based on the group of the character.

The display unit 220 may display by switching the group of the character based on an operation signal of the dial part 211. For example, the display unit 220 may display a first character group, and after this, display by switching to another character group excluding the first character group when a character switch signal is input.

Here, when the first character group is Hangul, another character group may be English which is a second character group, Arabic numbers which are a third character group, special characters which are a fourth character group, or Chinese characters which are a fifth character group.

The displaying by switching to another character group may include determining a group of a character selected by the user based on the operation signal of the dial part 211, and displaying by switching to the determined group of the character.

Further, the display unit 220 may display by maintaining the group of the displayed character regardless of the group of the handwritten character when a character is handwritten in the touch part 212, and display the character handwritten in the dial window 223.

The display unit 220 may confirm a character similar to the handwritten character, and display the confirmed character in the candidate window 224 as a candidate group.

Here, the confirming of the character similar to the handwritten character may include confirming a character in the range of a predetermined matching rate among matching rates between the handwritten character and the plurality of characters by comparing the handwritten character and information of the plurality of characters.

Here, the candidate window 224 may display only when there is no character in which the matching rates between the handwritten character and the plurality of characters are equal to or more than the predetermined matching rate, in a handwritten mode.

Further, the display unit 220 may display a character selected by an operation of the dial part 211 or a character which is handwritten on the touch part 212 in the input window 222.

The control unit 230 may switch the character input mode to a dial operation mode when the dial part 211 is operated, control movement of the cursor 221a in the plurality of blocks of the character window 221 based on the rotation operation signal of the dial part 211, control a position indication of the moved cursor 221a, recognize a character selected by the user based on the pressurization signal of the dial part 211, and perform control to display the recognized character in the input window 222.

Here, the recognizing of the character selected by the user may include confirming a block in which the cursor 221a locates, and recognizing a character which is set in the confirmed block.

The control unit 230 may switch the character input mode to the handwritten recognition mode when the touch part 212 is touched, confirm a movement path corresponding to a position of a touch point touched on the touch part 212, perform control to display the confirmed movement path, recognize a character based on the movement path, and perform control to display the recognized character in the input window 222.

The control unit 230 may confirm matching rates with the plurality of characters by comparing a handwritten character and each of the plurality of characters which are previously stored when a character is handwritten, and recognize the handwritten character as a character by a user's intention when the confirmed matching rates are equal to or more than the reference matching rate.

The control unit 230 may confirm a candidate group of the handwritten character when the confirmed matching rate is less than the reference matching rate, and perform control to display the confirmed candidate group in the candidate window 224.

The control unit 230 may confirm a character having a matching rate in the range of the predetermined matching rate among the matching rates between the handwritten character and the plurality of characters, and designate the confirmed character as the candidate group.

The control unit 230 may recognize a character selected by a user among the characters of the candidate group based on the operation signal of the dial part 211 when controlling to display the candidate group.

The control unit 230 may perform control to switch the character input mode to the dial operation mode when the dial operation signal is input after the touch signal is input in the touch part 212.

The control unit 230 may perform control to display the second character group in the input window 222 by recognizing the second character group in a state in which the first character group is displayed on the display unit 220 when the second character group is handwritten in the touch part 212 in a state in which the first character group is displayed on the display unit 220.

The control unit 230 may determine a character group selected by the user's intention based on the operation signal of the dial part 211, and perform control to display the determined character group in the character window 221.

The control unit 230 may perform control to display operation information of a function selected by the user on the second region 220b.

The control unit 230 may perform control to change a region of the display unit 220 to be controlled based on the operation signal of the left and right straight line directions, and activate the region to be controlled.

The control unit 230 may perform control to change the movement of a column in the region to be controlled based on the operation signal of the up and down straight movement of the dial part 211, perform control to change block movement in the column to be controlled based on the operation signal of the rotation of the dial part 211, and perform control to select based on the pressurization signal of the dial part 211.

The control unit 230 may confirm an icon selected by the user based on the operation signal of the dial part 211 when the third region 220c is activated, and perform control to perform a function corresponding to the confirmed icon.

The control unit 230 may perform control to display the cursor 221a in the reference block of the character window 221 when entering the character input mode, perform control to move the cursor 221a based on the operation signal of the dial part 211, and perform control to display the cursor 221a in a block of a selected character after any one character is selected based on the operation signal of the dial part 211.

Further, the control unit 230 may automatically change a position of the cursor 221a to the reference position after any one character is selected.

Here, the reference block may be a block of a first column which is located in the uppermost of the character window 221.

The control unit 230 may perform control to perform an execution of a button based on a button signal of the button part 213.

Further, the control unit 230 may request a path search to a server 300 when destination is input in the navigation function, and guide the path based on a received path when the searched path is transmitted from the server 300.

The storage unit 240 may store the plurality of characters, store by classifying according to the group of the character, store information on the plurality of characters, and store the reference matching rate and the range of the predetermined matching rate.

Here, the information on the plurality of characters may be information for classifying the plurality of characters, for example, the classifying of the plurality of characters may be performed by a pattern matching method, a structure analysis method, a feature matching method, and a stroke analysis method, etc.

The storage unit 240 may store a plurality of functions, and a program for executing each function.

The storage unit 240 may store a map database, and store recent destination, destination set by the user, etc.

The communication unit 250 may perform communication with the GPS (not shown), and transmit a received current position to the control unit 230.

Here, the GPS may input a position signal of each of the plurality of GPS satellites, and calculate its own (that is, the vehicle) position, and transmit the calculated position to the communication unit 250.

Further, the GPS may include a GPS antenna ANT for receiving a satellite signal from the plurality of GPS satellites, an acceleration sensor (not shown) for measuring an acceleration of the vehicle, and a direction sensor (not shown) for sensing a direction of the vehicle, and may transmit a current position, acceleration data, direction data of the vehicle to the communication unit 250.

The communication unit 250 may perform communication with an external device and the server 300 through a wired or wireless communication network.

Here, the wired or wireless communication network may include a broadcasting network such as a transport protocol expert group (TPEG), a Stream X-Machine (SXM), a relational database service (RDS) for a Digital Multimedia Broadcasting (DMB), etc.

The user interface device 200 may further include a port such as a universal serial bus (USB) provided in the body, and at this time, the communication unit 250 may perform communication with the external device connected to the port, etc.

The communication unit 250 may further include USB communication, and transmit a set-up program or various update information, etc. received through the USB communication to the control unit 230.

The sound unit 260 may output a path and driving information when guiding the path as a sound, and output music and a sound of an image selected by the user.

In this embodiment of the present invention, the navigation device installed in the vehicle was described as an example of the user interface device, but the user interface device may be also implemented in a mobile communication terminal or a tablet personal computer (PC), etc. having the navigation function (App).

The server 300 may perform communication with the navigation device, search the path based on a position and destination of the vehicle when a path search request signal transmitted from the navigation device is received, and transmit the searched path to the navigation device.

A path search method used by the server 300 may include searching a plurality of paths by combining a plurality of roads between the position of the vehicle and the destination, calculating costs of the plurality of paths based on road environments of each path, and selecting a path having lowest cost among the calculated costs.

Here, the road environments may include a road type, whether or not there is a construction or an accident, the number of traffic lights, traffic information such as congestion/slow/smooth, etc.

Figure 8A:
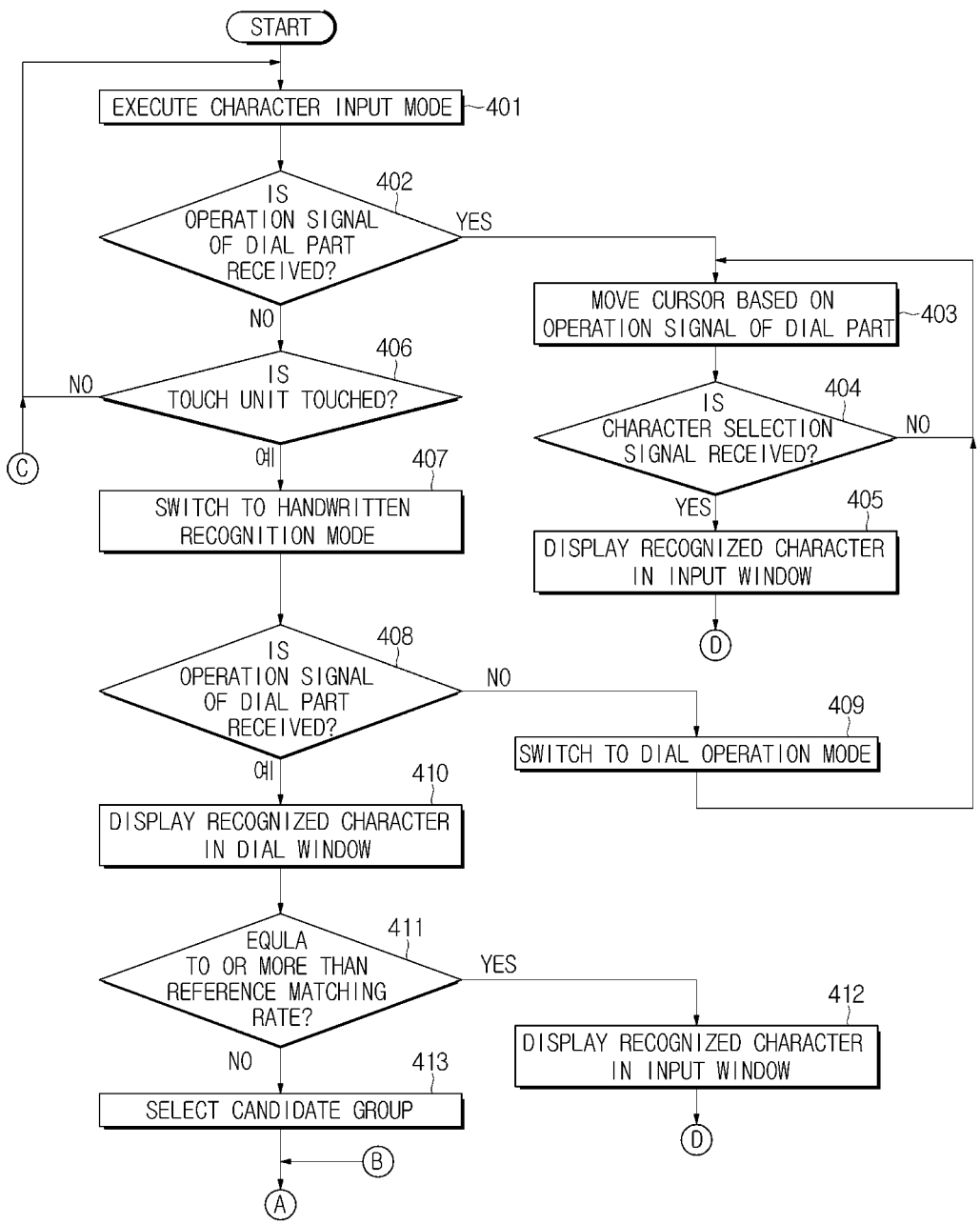
FIGS. 8A and 8B are flowcharts for describing a control operation of a user interface device according to an embodiment of the present invention.
Figure 8B:
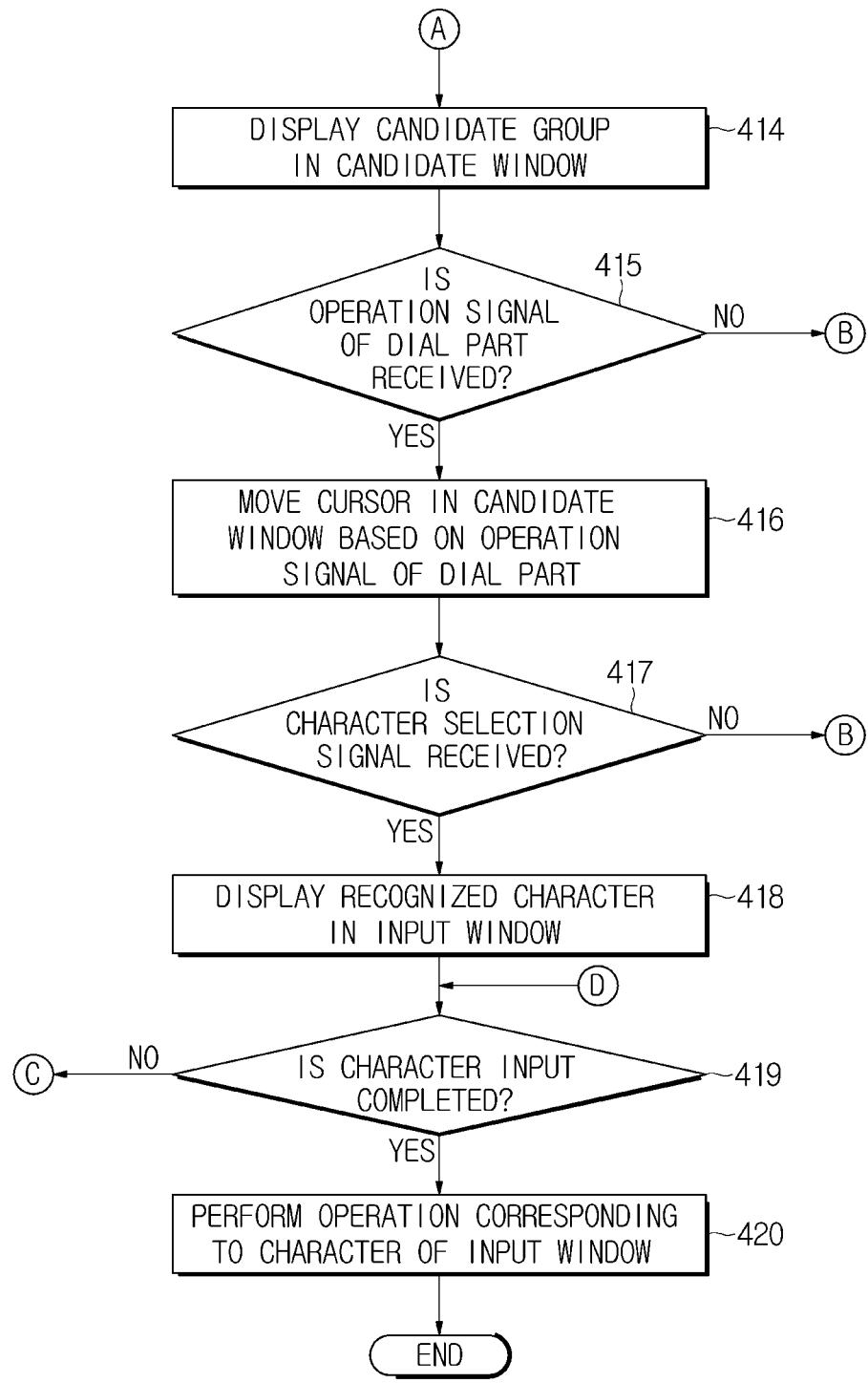

FIGS. 8A and 8B are flowcharts for describing control of a user interface device according to an embodiment of the present invention, and this will be described with reference to FIGS. 9 to 15.

As shown in FIG. 9, the user interface device 200 may display a division of the display unit 220 into the first region 220a to the fifth region 220e, display a plurality of windows for inputting a character in the first region 220a, display an execution image of a function selected by the user in the second region 220b, display icons of a plurality of functions which are selectable by the user in the third region 220c, display basic information in the fourth region 220d, and display air conditioning information in the fifth region 220e.

The user interface device 200 may execute the character input mode when a destination search, an address list search, a telephone list search, an Internet search, or a music search, etc. is selected (401).

The user interface device 200 may activate the first region 220a of the display unit 220.

Further, the user interface device 200 may recognize the selected input mode as being the character input mode when the first region 220a is activated.

Moreover, the user interface device 200 may produce a display dividing the first region 220a and the second region 220b when the character input mode is executed when the first region 220a and the second region 220b of the display unit 220 are integrally displayed. At this time, the user interface device 200 may display a reduced image by reducing size of an image displayed on the display unit 220 in the second region 220b, and display the plurality of windows for inputting the character in the first region 220a.

The user interface device 200 may display a character group which is predetermined in the character window 221 when entering the character input mode, or a character group which is displayed at the ending time of the character input mode.

For example, the user interface device 200 may display English of the second character group which is predetermined in the character window 221 when entering the character input mode, and may display the plurality of columns divided in a longitudinal direction, and display a plurality of function buttons such as a capitals lock button, a character group switch button, a special character switch button, a space button, a delete button, an OK button, etc. on the lowermost column.

Here, the character switch button may be a button switching two character groups which are mostly used, and the special character switch button may be a button displaying both numbers and special characters.

For example, the character switch button may switch between Hangul which is the first character group and English which is the second character group according to the pressurization of the dial part 211. The special character switch button may switch to display the special character including the numbers when the first character group or the second character group is displayed.

Here, each button may be displayed as an icon.

The user interface device 200 may display the dial window 223 to have the same shape as or a shape similar to that of the dial part 211, and display an emoticon such as a hand shape in the dial window 223 when the touch part 212 is touched.

The user interface device may determine whether an operation signal is received from the dial part 211 (402), switch the character input mode to the dial operation mode when it is determined that the operation signal is received from the dial part 211, and move the cursor 221a based on the operation signal transmitted from the dial part 211.

Here, the operation signal transmitted from the dial part 211 may include a rotation operation signal of a first rotation direction or a second rotation direction.

The user interface device 200 may move the cursor 221a based on rotation operation of the dial part 211 before the pressurization signal is received from the dial part 211, and move the cursor 221a to an upper column or lower column corresponding to a moved direction when the pressurization signal is moved in the up or down direction.

As such, the user interface device 200 may determine whether a signal for selecting a character is received (404) while moving the cursor 221a corresponding to the rotation and vertical movement operations (403).

That is, the user interlace device 200 may determine whether the signal transmitted from the dial part 211 is the pressurization signal, confirm a block in which the cursor 221a locates at the pressurization time when it is determined that the signal transmitted from the dial part 211 is the pressurization signal, recognize a character of the confirmed block, determine the recognized character as a character selected by the user, and display the recognized character on the input window 222 (405).

Figure 10A:
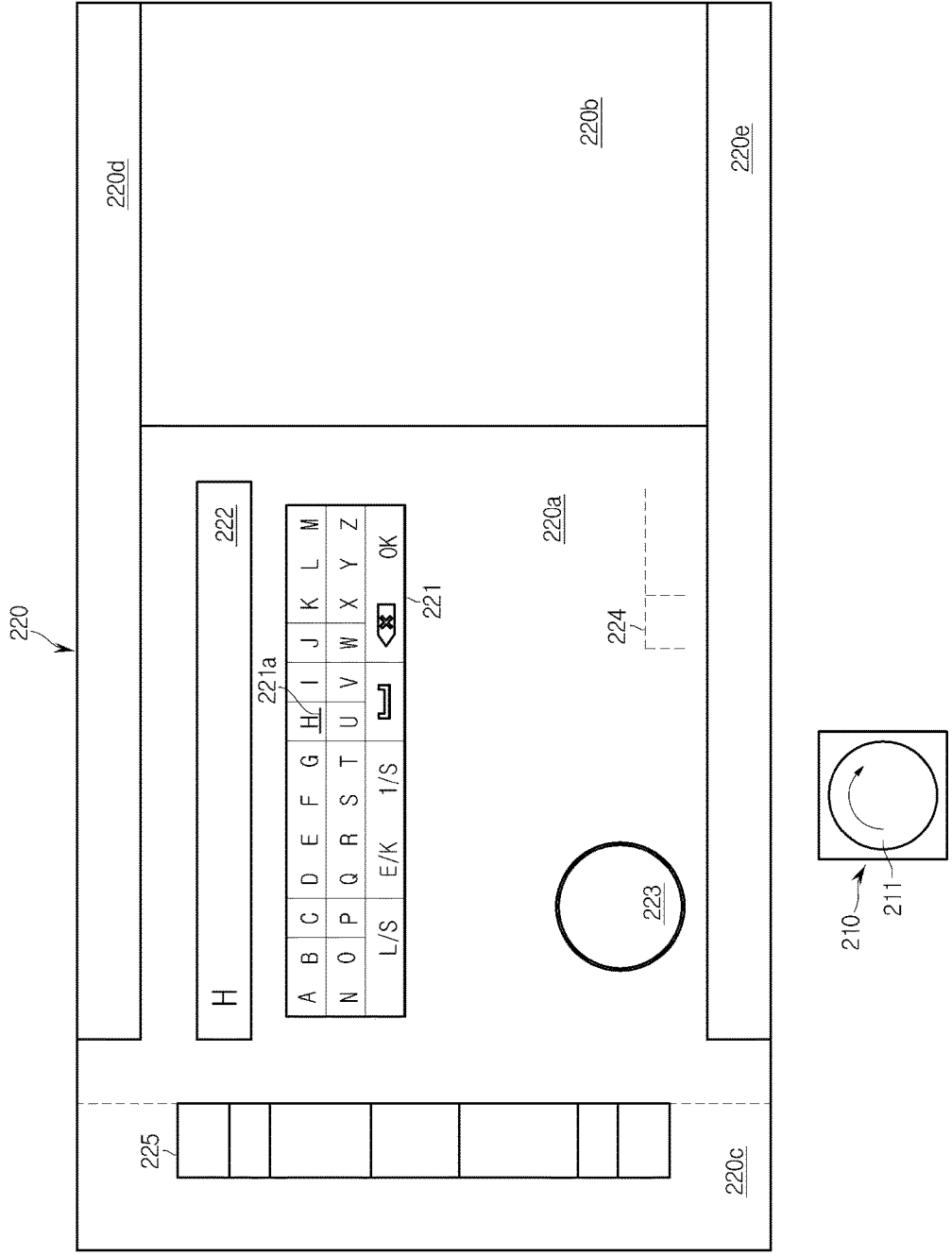

As shown in FIG. 10A, the user interface device 200 may display by moving the cursor 221a from the reference block to the right block when the dial part 211 rotates in the first rotation direction (that is, a clockwise direction) when the cursor 211a is displayed in the reference block when the character input mode is entered.

At this time, the number of blocks in which the cursor 221a moves may be determined based on a rotation angle of the dial part 211.

Further, the dial part 211 may be pressurized by the user when a cursor 221a is located in a block in which a character that the user wants is arranged. At this time, the user interface device 200 may receive the pressurization signal of the dial part 211, confirm a block in which a cursor 211a locates at a time when the pressurization signal is received, and display a character "H" arranged in the confirmed block in the input window 222.

As shown in FIG. 10B, the user interface device 200 may move the cursor 221a based on a straight movement direction, a rotation direction, and a rotation angle of the operation signal transmitted from the dial part 211, confirm a block in which the cursor 221a locates at a time when the pressurization signal is received from the dial part 211, and display a character "Y" arranged in the confirmed block in the input window 222.

The user interface device 200 may input a character from the user by repeatedly performing the method described above.

The user interface device 200 may determine whether the touch part 212 is touched when the dial part 211 is not operated when the character input mode is entered, determine whether the touch part 212 is touched while receiving a character in the dial operation mode (406), and switch the character input mode to the handwritten recognition mode when it is determined that the touch part 212 is touched (407).

The user interface device 200 may determine whether the dial part 211 is immediately operated in the handwritten recognition mode (408), switch the character input mode to the dial operation mode when it is determined that the dial part 211 is immediately operated (409), and on the other hand, maintain the handwritten recognition mode when it is determined that the dial part 211 is not operated.

The user interface device 200 may confirm a movement path of a touch point touched in the touch part 212 in the handwritten recognition mode, recognize a character handwritten by the user based on the confirmed movement path, and display the recognized character in the dial window 223 (410).

The user interface device 200 may confirm matching rates between the recognized character and the plurality of characters by comparing the recognized character and information of the plurality of characters, confirm the highest matching rate among the matching rates, and determine whether the confirmed highest matching rate is equal to or greater than the reference matching rate (411).

Further, the user interface device 200 may recognize a character having the confirmed highest matching rate as a character handwritten by the user when it is determined that the confirmed highest matching rate is equal to or greater than the reference matching rate, and display the recognized character in the input window 222 (412). This will be described with reference to FIG. 11.

As shown in FIG. 11, the user interface device may confirm a movement path of a touch point touched in the touch part 212, recognize the confirmed movement path as a character which is handwritten, and display a recognized character "U" in the dial window 223. At this time, the recognized character "U" may be immediately displayed in the input window 222 without displaying a candidate group since the matching rate between the recognized character "U" and a character "U" stored in the storage unit 240 is equal to or more than the reference matching rate.

On the other hand, the user interface device 200 may confirm the matching rate included in the region of the predetermined matching rate among the matching rates when it is determined that the highest matching rate is lower than the reference matching rate, select at least one character having the confirmed matching rate as the candidate group (413), and display the selected candidate group in the candidate window 224 (414).

The displaying of the candidate group may include displaying in decreasing order of the matching rate, or displaying in a predetermined block of each character group.

Next, the user interface device 200 may determine whether the operation signal is received from dial part 211 when displaying the candidate group in the plurality of blocks of the candidate window 224 (415), and display by moving the cursor 221a in the plurality of blocks of the candidate window 224 based on the rotation angle and the rotation direction when the rotation operation signal is received from the dial part 211 (416).

The user interface device 200 may determine whether the pressurization signal is received from the dial part 211 (417), confirm a block in which the cursor 221a locates at the pressurization time when it is determined that the pressurization signal is received from the dial part 211, recognize a character of the confirmed block, determine the recognized character as a character handwritten by the user, and display the recognized character in the input window 222 (418). This will be described with reference to FIGS. 12, 13A and 13B.

Figure 12:
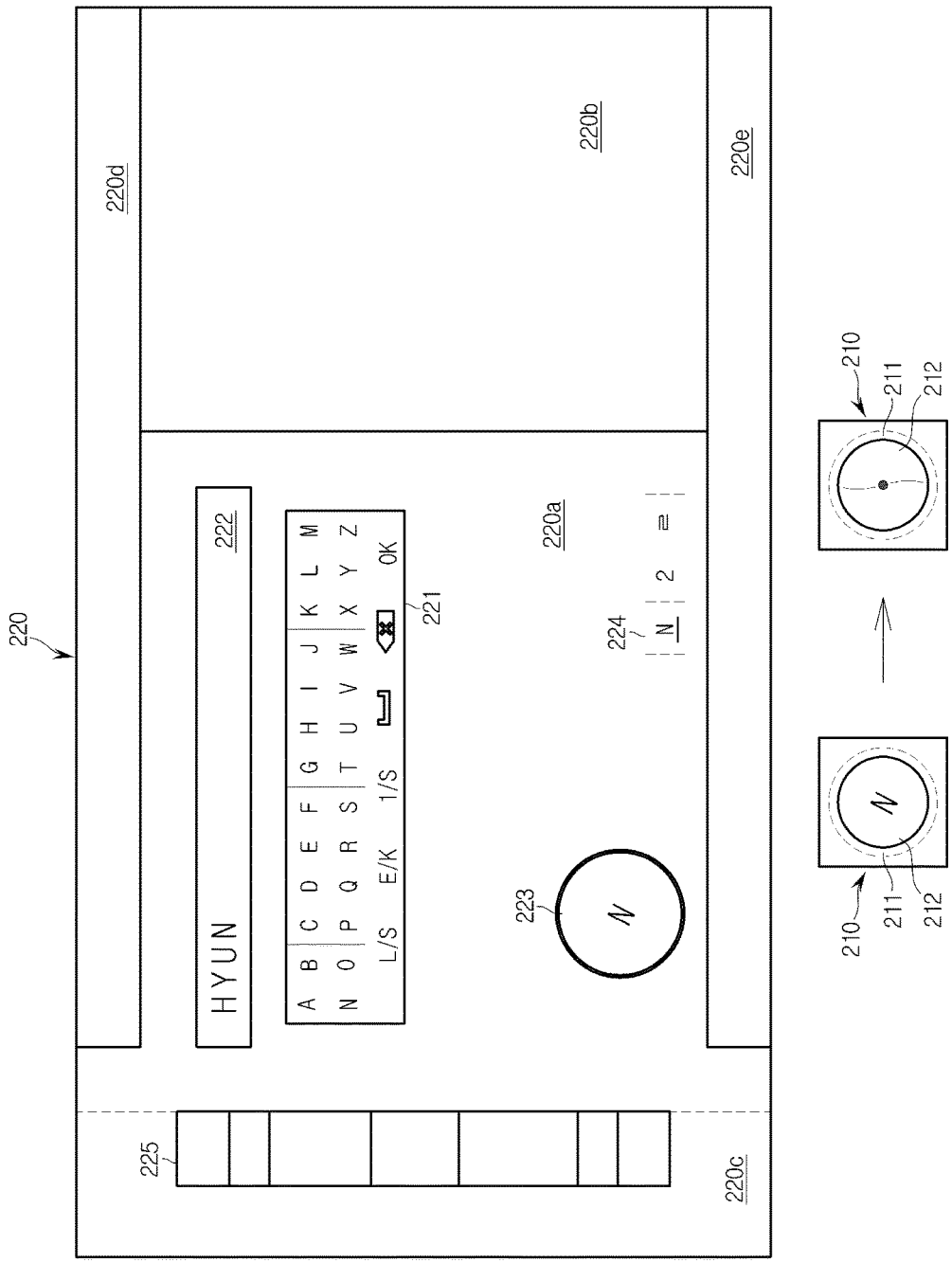

As shown in FIG. 12, the user interface device 200 may recognize a character in the handwritten recognition mode when the character is handwritten in the touch part 212 after displaying a character "U" in the input window 222.

That is, the user interface device 200 may confirm a character in the range of the predetermined matching rate when the matching rates between the character handwritten in the touch part 212 and the plurality of characters are lower than the reference matching rate, and display the confirmed character as the candidate group in the candidate window 224.

The user interface device 200 may display "N", "2", "ㄹ" as the candidate group of the character handwritten by the user in the candidate window 224, and display by moving the cursor 221a in the blocks of three candidate groups.

The user interface device 200 may confirm a block in which the cursor 221a locates at the pressurization time when the pressurization signal is received from the dial part 211, confirm the character in the confirmed block, and display the confirmed character in the input window 222.

At this time, the character of the candidate group displayed in the candidate window 224 may be displayed in the decreasing order of the matching rate with the handwritten character.

As shown in FIG. 13A, the user interface device 200 may recognize the character in the handwritten recognition mode when a character is handwritten in the touch part 212 after displaying the character "N" in the input window 222.

That is, the user interface device 200 may confirm a character in the region of the predetermined matching rate when the matching rates between the handwritten character and the plurality of characters is lower than the reference matching rate, and display the confirmed character as the candidate group in the candidate window 224.

Figure 13B:
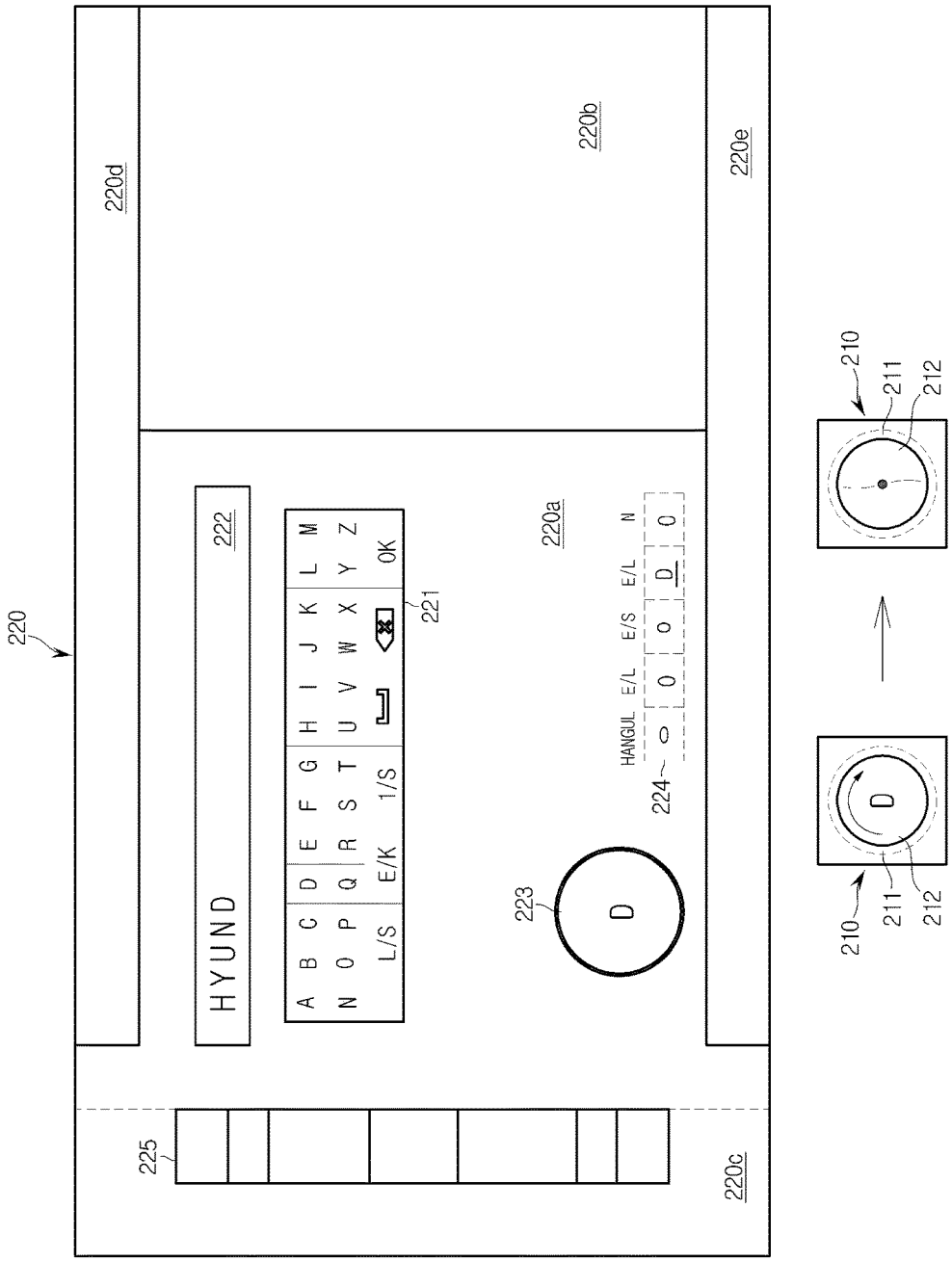

As shown in FIG. 13B, the user interface device 200 may display "o" (Hangul), "O" (English/large), "o" (English/small), "D" (English), "0" (number) as the candidate group of the character handwritten by the user in the candidate window 224, and display by moving the cursor 221a in the blocks of three candidate groups based on the rotation operation of the dial part 211.

The user interface device 200 may confirm a block in which the cursor 221a becomes located at the pressurization time when the pressurization signal is received from the dial part 211, confirm the character in the confirmed block, and display the confirmed character in the input window 222.

At this time, the character of the candidate groups displayed in the candidate window 224 may be displayed according to the predetermined order of each character group, and be displayed in decreasing order of the matching rate with the handwritten character when there are a plurality of characters in the same character group.

Further, the character group may be displayed in the block of the candidate window 224.

The user interface device 200 may recognize a character handwritten in the touch part 212 through the method described above, display the recognized character in the input window 222, and switch the character input mode to the dial operation mode when the operation signal is received from the dial part 211 while a character is input in the handwritten recognition mode.

The user interface device 200 may maintain display of the character group displayed in the character window 221 in a state of automatically switching the character input mode to the dial operation mode and the handwritten recognition mode. That is, the user interface device 200 may maintain display of the second character group of the character window 221 even when the first character group is input due to the handwritten recognition mode when the second character group is displayed in the character window 221.

This will be described with reference to FIGS. 14A to 14C.

Figure 14B:
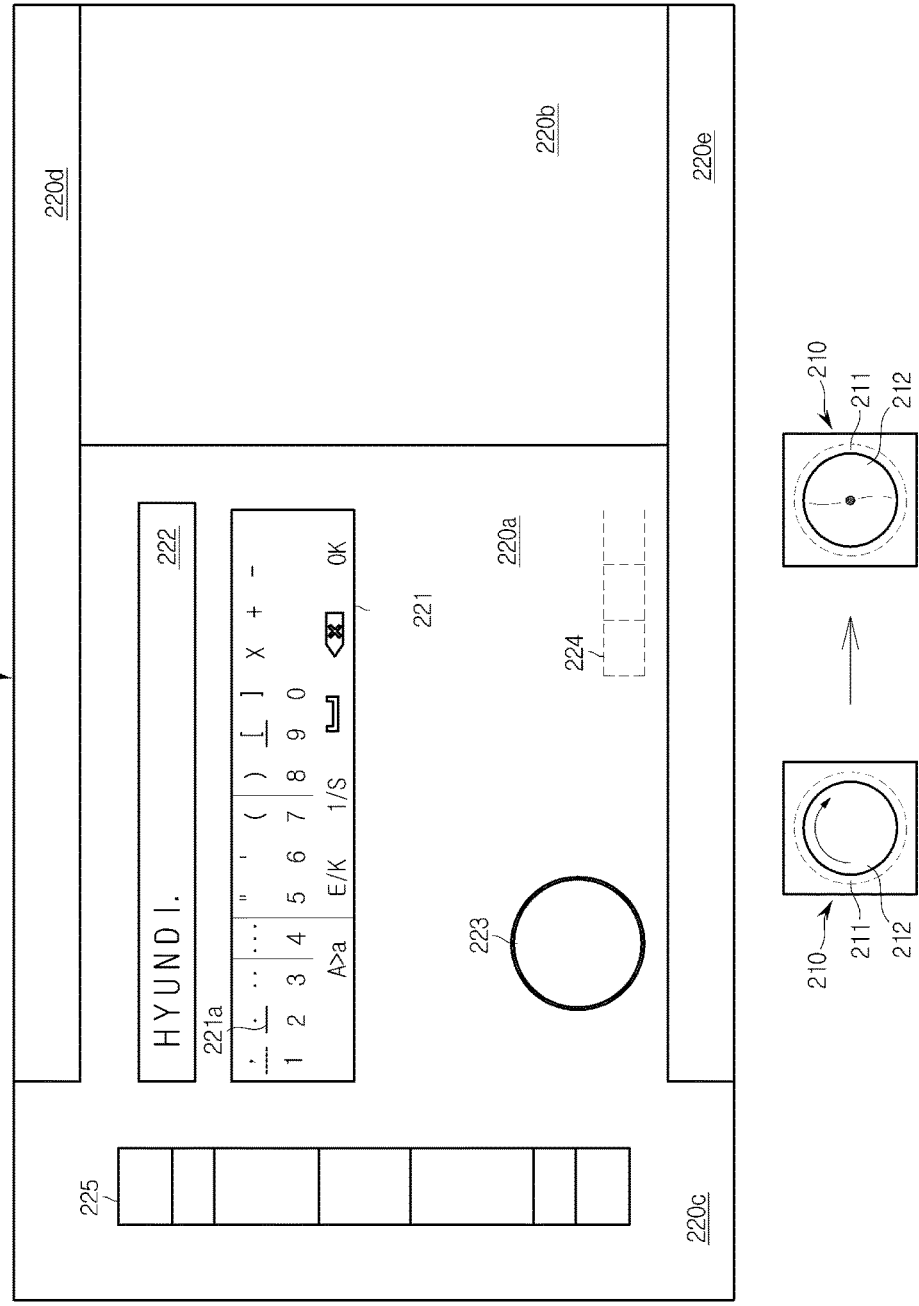

As shown in FIGS. 14A and 14B, the user interface device 200 may switch the character input mode to the dial operation mode when the dial part 211 is operated in a state in which a character "HYUNDAI" is displayed in the input window 222, and recognize a next character based on the operation signal of the dial part 211.

That is, the user interface device 200 may move the cursor 221a based on the vertical movement and rotation operation signal of the dial part 211, switch English, which is the second character group, to the special character group, which is the fourth character group, when the pressurization signal is received from the dial part 211 in a state in which the cursor 221a locates in the special character button, and display the switched character group in the character window 221.

The user interface device 200 may display the cursor 221a in the reference block of the character window 221, move the cursor 221a based on the vertical movement and rotation operation signal, and display a point in the input window 222 when the pressurization signal is received from the dial part 211 when the cursor 221a locates in the point.

As shown in FIG. 14C, the user interface device 200 may switch the character input mode to the handwritten recognition mode when the touch part 212 is touched, confirm a movement path of a touch point touched in the touch part 212, display a character corresponding to the confirmed movement path in the dial window 223, and recognize the confirmed character. At this time, the user interface device 200 may maintain the display of the fourth character group displayed in the character window 221.

Further, the user interface device 200 may confirm a character in the range of the predetermined matching rate when the matching rates between the character handwritten in the touch part 212 and the plurality of characters are lower than the reference matching rate, and display the confirmed character as the candidate group in the candidate window 224.

The user interface device 200 may display "l" (Hangul), "I" (English), "1" (number) as the candidate groups of the character handwritten by the user in the candidate window 224, and display by moving the cursor 221a in blocks of three candidate groups based on the rotation operation of the dial part 211.

The user interface device 200 may confirm a block in which the cursor 221a locates at the pressurization time when the pressurization signal is received from the dial part 211, confirm a character in the confirmed block, and display the confirmed character in the input window 222.

At this time, the character displayed in the candidate window 224 may be displayed in the predetermined order of each character group. For example, Hangul, English, number may be sequentially displayed.

Further, the character group may be displayed in the block of the candidate window 224.

The user interface device 200 may automatically switch the character group displayed in the character window to the handwritten character group according to the input character group in the handwritten recognition mode.

The user interface device 200 may receive an input of a character while switching the character input mode based on the operation signal of the dial part 211 and the touch signal of the touch part 212, determine whether a character input completion signal is input by the user while inputting the character (419), and perform an operation corresponding to the input character when it is determined that the character input completion signal is input (420).

Here, the determining whether the character input completion signal is input may include determining whether a confirmation block OK of the character window 221 is selected according to the vertical movement and rotation operation signal, determining whether a gesture of the touch point touched in the touch part 212 is a gesture corresponding to the confirmation, and determining whether the number of the pressurization in the dial part 211 is the number corresponding to the confirmation.

Further, an operation corresponding to the input character may be displayed in the second region 220b.

The present invention can improve the user's convenience and satisfaction by automatically switching between the character input mode for selecting the character displayed on the display unit and the character input mode for receiving an input of the character using the handwritten recognition.

Further, the present invention can simplify the character input procedure since the character switch operation is omitted by comparing the handwritten character and the plurality of characters prestored regardless of the character group displayed on the display unit and recognizing the character. Accordingly, the present invention can increase character input speed.

Moreover, the present invention can reduce error of character recognition by automatically switching the handwritten recognition mode to the dial operation mode when the operation signal of the dial part is sensed when touch is sensed in the touch pad of the dial part.

Also, the present invention can exactly receive input of a character handwritten by the user by displaying the handwritten character and its candidate group and being finally selected by the user.

Accordingly, since quality of the user interface device and the vehicle is improved, merchantability can be increased, and user convenience and vehicle stability can be improved.

Although exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A user interface device, comprising:
a display configured to display a plurality of characters;
a dial part installed separately from the display, and configured to select any one character from among the plurality of characters;
a touch part provided integrally with the dial part, and configured to be touched by a user; and
a controller configured to select a character input mode as a handwritten recognition mode when the touch part is touched, and select the character input mode as a dial operation mode when the dial part is operated,
wherein the plurality of characters includes a first character group and a second character group each corresponding to a different kind of character,
when the first character group is displayed on the display and the second character group is handwritten in the touch part, the controller performs control to maintain display of the first character group in one part of the display, and performs control to display the handwritten second character group in another part of the display.

2. The user interface device according to claim 1, wherein the controller as configured recognizes a character selected by the user based on an operation signal of the dial part, and performs control to display the recognized character on the display.

3. The user interface device according to claim 1, wherein the controller as configured recognizes a character handwritten by the user based on a touch signal of the touch part, and performs control to display the recognized character on the display.

4. The user interface device according to claim 3, wherein the controller as configured confirms a matching rate by comparing the handwritten character and each of a plurality of prestored characters, confirms a candidate group of the handwritten character when the confirmed matching rate is less than a reference matching rate, and performs control to display the confirmed candidate group.

5. The user interface device according to claim 4, wherein the controller as configured confirms a character having a matching rate which is in the range of a predetermined matching rate among matching rates between the handwritten character and the plurality of characters as the candidate group.

6. The user interface device according to claim 4, wherein the controller as configured confirms a character selected by the user among characters included in the candidate group based on an operation signal of the dial part.

7. The user interface device according to claim 1, wherein the controller as configured switches the character input mode to the dial operation mode when a dial operation signal is input in the dial part after the touch signal is input in the touch part.

8. The user interface device according to claim 1, wherein the controller as configured performs control to display by switching the kind of the character based on an operation signal of the dial part.

9. The user interface device according to claim 1, wherein the touch part is separately installed from the display.

10. A vehicle, comprising:
a user interface device including a display configured to display a plurality of characters, and an input configured to move in a straight direction, rotate, and receive a touch signal; and
a controller configured to select a character input mode of the user interface device as a handwritten recognition mode when the input is touched, and select the character input mode as a dial operation mode when the input is moved,
wherein the plurality of characters includes a first character group and a second character group each corresponding to a different kind of character,
when the first character group is displayed on the display and the second character group is handwritten in the touch part, the controller performs control to maintain display of the first character group in one part of the display, and performs control to display the handwritten second character group in the other part of the display.

11. The vehicle according to claim 10, wherein the controller as configured recognizes a character selected by the user based on an operation signal of the input, recognizes a character handwritten by the user based on a touch signal of the input, and perform control to display the recognized character on the display.

12. The vehicle according to claim 11, wherein the controller as configured confirms a matching rate by comparing the handwritten character and each of a plurality of characters which are previously stored, confirms a candidate group of the handwritten character when the confirmed matching rate is less than a reference matching rate, and performs control to display the confirmed candidate group.

13. The vehicle according to claim 12, wherein the controller as configured confirms a character selected by the user among characters included in the candidate group based on the operation signal of the input.

14. The vehicle according to claim 10, wherein the controller as configured recognizes the character input mode as the dial operation mode when the operation signal is input after the touch signal is input in the input.

15. The vehicle according to claim 10, wherein the input of the user interface device includes a dial part configured to move in up, down, left, and right directions, and rotate clockwise and counterclockwise, and a touch part configured to generate the touch signal.

16. A method of controlling a user interface device comprising a display, a dial part, and a touch part, the method comprising:
selecting a character input mode as a dial operation mode when the dial part is operated;
recognizing a character selected by a user among a plurality of characters displayed on the display based on an operation signal of the dial part;
selecting a handwritten recognition mode as the character input mode when the touch part is touched;
recognizing the character handwritten by the user based on a touch signal of the touch part; and
displaying the recognized character on the display,
wherein the displaying of the recognized character on the display comprises:
recognizing a second character group of the plurality of characters which is handwritten when the second character group is handwritten in the touch part, maintaining display of the first character group in one part of the display, and performing display of the handwritten second character group in another part of the display.

17. The method of controlling the user interface device according to claim 16, wherein the recognizing of the character handwritten by the user, comprises:
confirming a matching rate by comparing the handwritten character and each of a prestored plurality of characters;
selecting a character having a matching rate which is in the range of a predetermined matching rate among matching rates between the handwritten character and the plurality of characters when the confirmed matching rate is less than a reference matching rate as a candidate group;
displaying the selected candidate group;
confirming a character selected by the user among characters of the candidate group based on an operation signal of the dial part; and
displaying the recognized character on the display.

18. The method of controlling the user interface device according to claim 16, further comprising:
switching the character input mode to the dial operation mode when the dial operation signal is input after a touch signal is input in the touch part.

19. The method of controlling the user interface device according to claim 16, further comprising:
determining whether a character group switch icon is selected among the plurality of characters based on the operation signal of the dial part; and
displaying by switching the first character group displayed in the one of the display to the second character group when it is determined that the character group switch icon is selected.

* * * * *